United States Patent [19]

Quatse et al.

[11] Patent Number: 4,484,307
[45] Date of Patent: Nov. 20, 1984

[54] ELECTRONIC POSTAGE METER HAVING IMPROVED SECURITY AND FAULT TOLERANCE FEATURES

[75] Inventors: Jesse T. Quatse, Sausalito; Donald E. Dodge, Jr., San Francisco; Richard K. Dove, Piedmont, all of Calif.

[73] Assignee: f.m.e. Corporation, Hayward, Calif.

[21] Appl. No.: 349,285

[22] Filed: Feb. 16, 1982

Related U.S. Application Data

[63] Continuation of Ser. No. 037,578, May 9, 1979, abandoned.

[51] Int. Cl.³ .............................................. G06F 15/20
[52] U.S. Cl. .................................................... 364/900
[58] Field of Search .............. 364/200, 900, 466, 406; 371/68, 10, 13, 21, 29, 15, 16, 26

[56] References Cited

U.S. PATENT DOCUMENTS

| | | | |
|---|---|---|---|
| 3,544,777 | 12/1970 | Winkler | 371/10 |
| 3,692,988 | 9/1972 | Dlugos et al. | 364/466 |
| 3,938,095 | 2/1976 | Check, Jr. et al. | 364/900 |
| 3,978,457 | 8/1976 | Check, Jr. et al. | 364/200 |
| 4,031,375 | 6/1977 | Jaskulke et al. | 371/16 |
| 4,063,081 | 12/1977 | Handley et al. | 364/200 |
| 4,090,247 | 5/1978 | Martin | 364/900 |
| 4,093,985 | 6/1978 | Das | 364/200 |
| 4,093,999 | 6/1978 | Fuller et al. | 364/900 |
| 4,096,560 | 6/1978 | Footh | 364/200 |
| 4,097,923 | 6/1978 | Eckert, Jr. et al. | 364/200 |
| 4,130,240 | 12/1978 | Millham et al. | 364/200 |
| 4,131,942 | 12/1978 | Gillett et al. | 364/200 |
| 4,145,761 | 3/1979 | Gunter et al. | 365/227 |
| 4,217,486 | 8/1980 | Tawfik et al. | 371/10 |
| 4,251,874 | 2/1981 | Check, Jr. | 364/900 |

*Primary Examiner*—Raulfe B. Zache
*Assistant Examiner*—David Y. Eng
*Attorney, Agent, or Firm*—Townsend and Townsend

[57] ABSTRACT

A microcomputerized postage meter that provides high degrees of security and fault tolerance. The meter maintains data security under low power conditions by the use of functionally nonvolatile memory units. Register and other data which must survive normal and abnormal losses of power to the meter electronics are stored in dual redundant battery augmented memories (hereinafter designated BAMs). Upon detecting an error condition, the microcomputer writes an appropriate fault code to the BAMs. A mechanism for disabling the meter includes dual redundant flip-flops which are set to a "faulted" state upon detection by the microcomputer of a failure condition. These flip-flops are powered by the BAM batteries. They cannot be reset except by physical access to the meter interior, which access is only available to authorized personnel at the factory. The fault flip-flops are also set when the microcomputer fails to properly execute its own operating program. Once the meter has been set to a "faulted" state, the fault flip-flops hold two signals, MPCLR ans SYSCLR, true. The BAM contents may still be read out independently of the microcomputer which is prevented from accessing the BAMs. This is accomplished by allowing power necessary to read the BAMs to be supplied to the BAMs without supplying power to the microcomputer. Moreover, even if the microcomputer is powered, MPCLR prevents it from executing instructions and SYSCLR isolates it.

21 Claims, 27 Drawing Figures

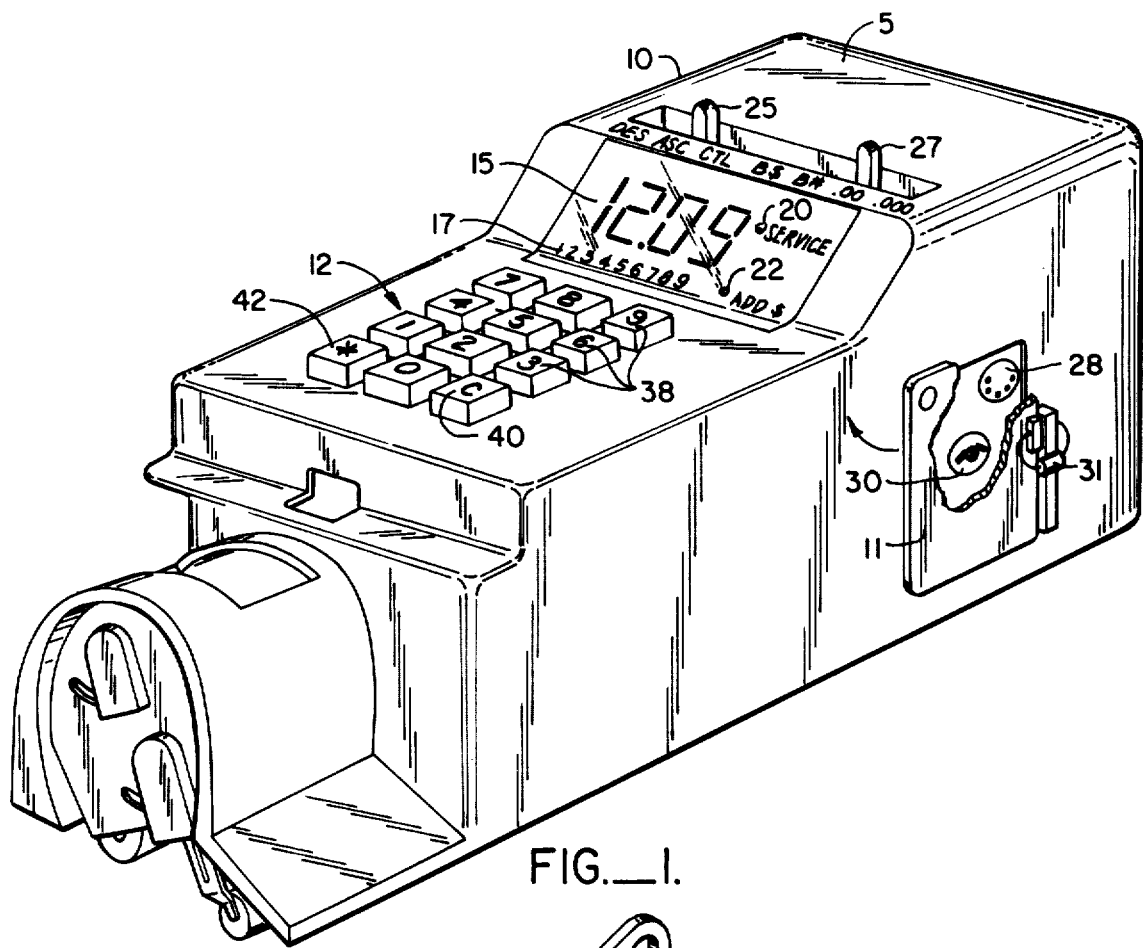
FIG._1.
FIG._2.

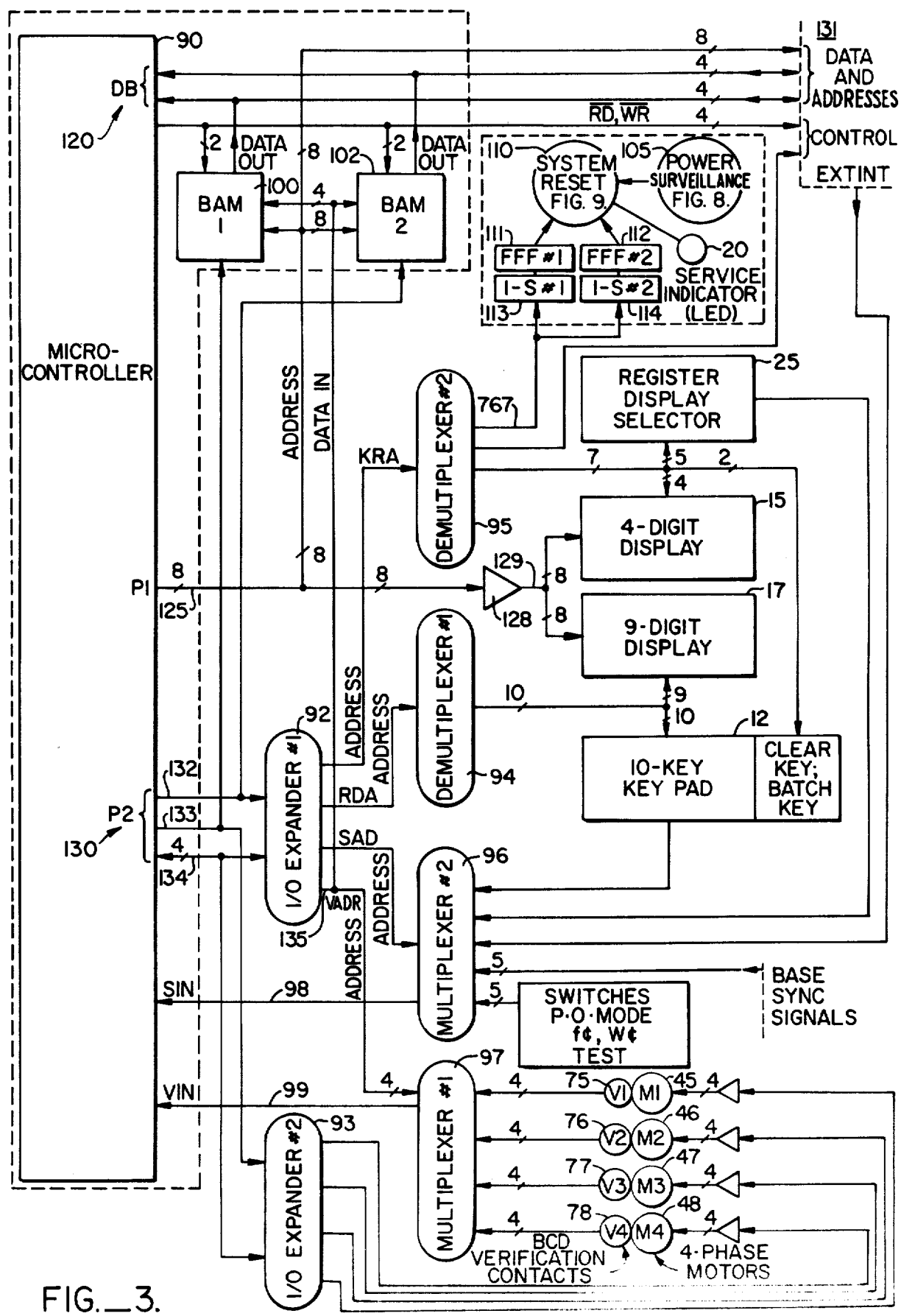
FIG._3.

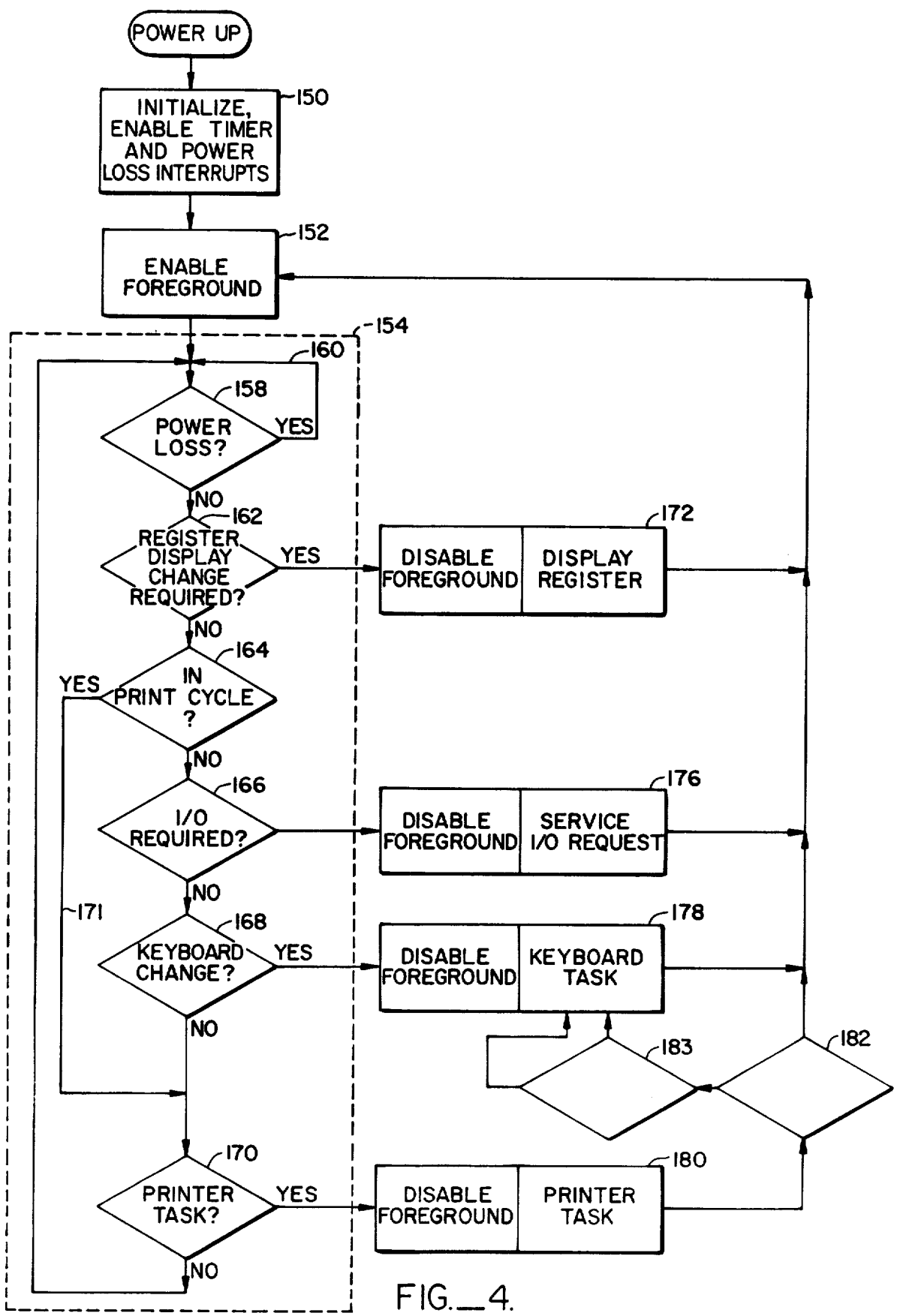
FIG._4.

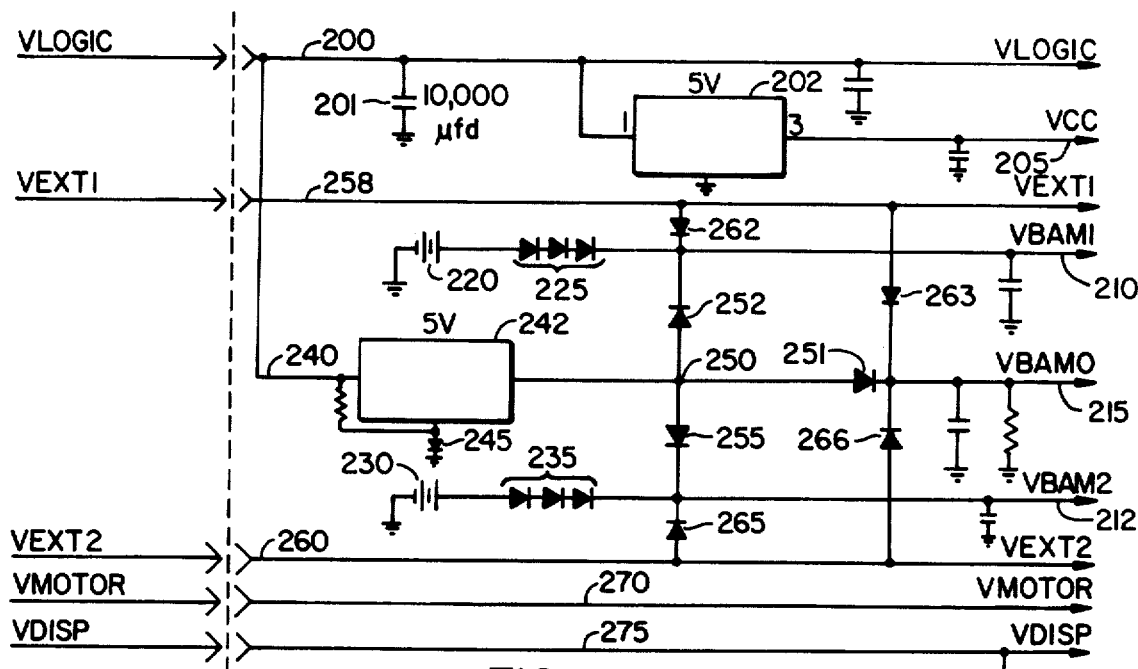
FIG._5.
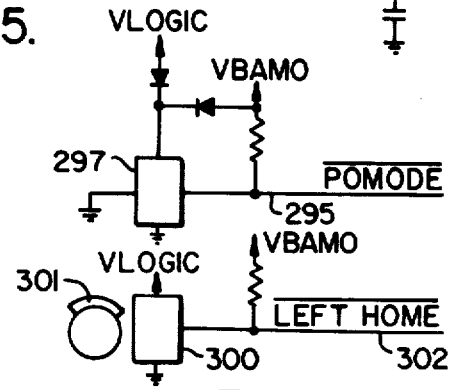
FIG._7.
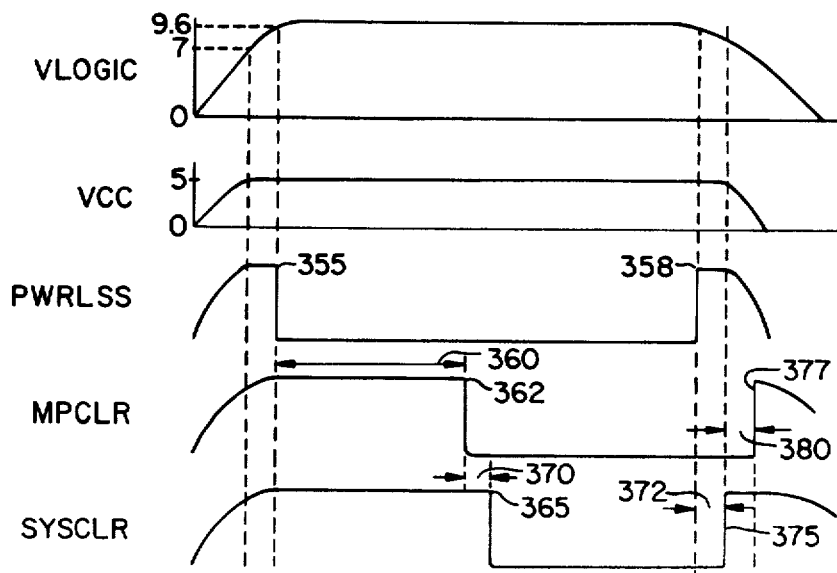
FIG._6.
FIG._10.

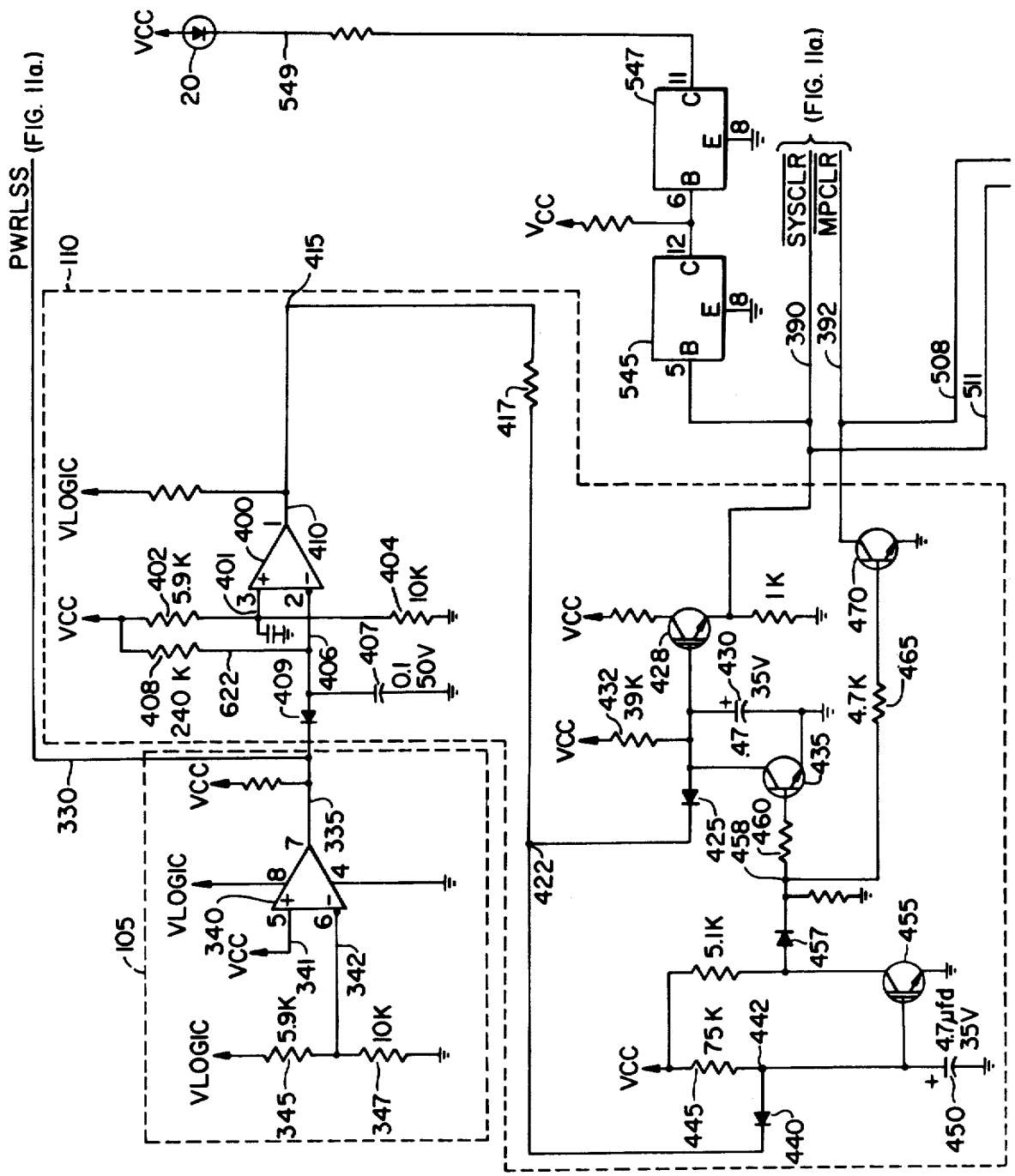
FIG._8.

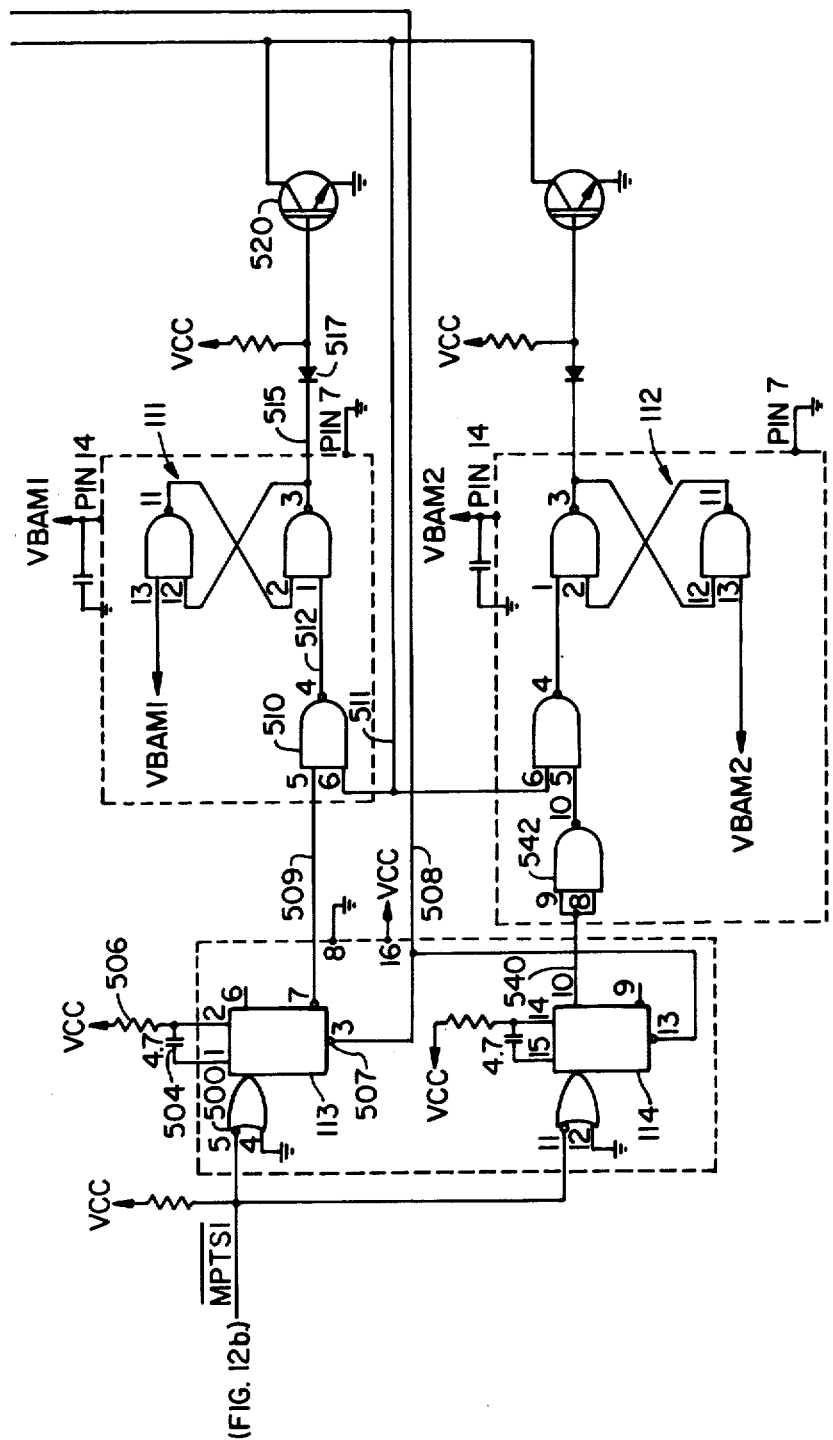
FIG._9.

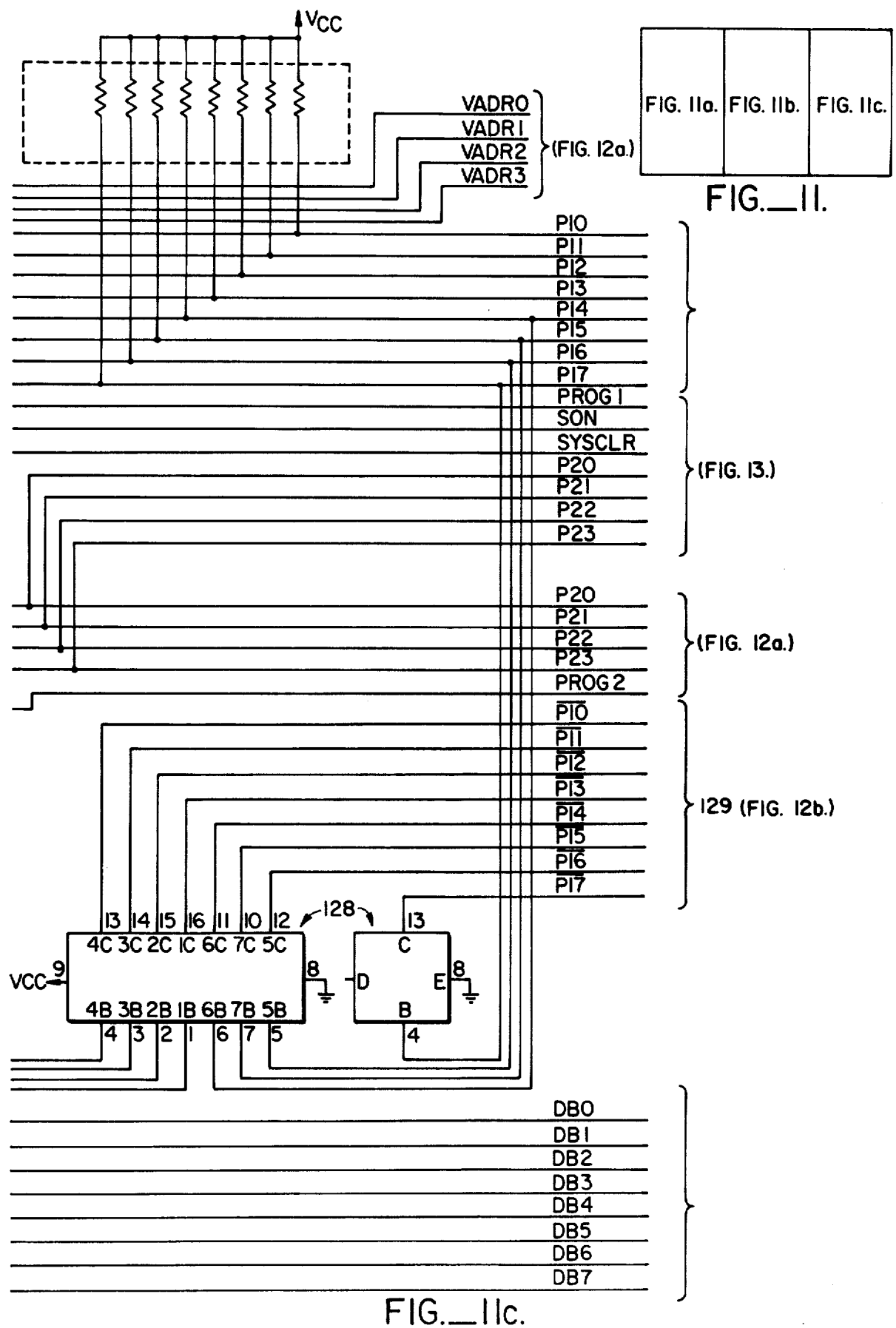
FIG._11c.

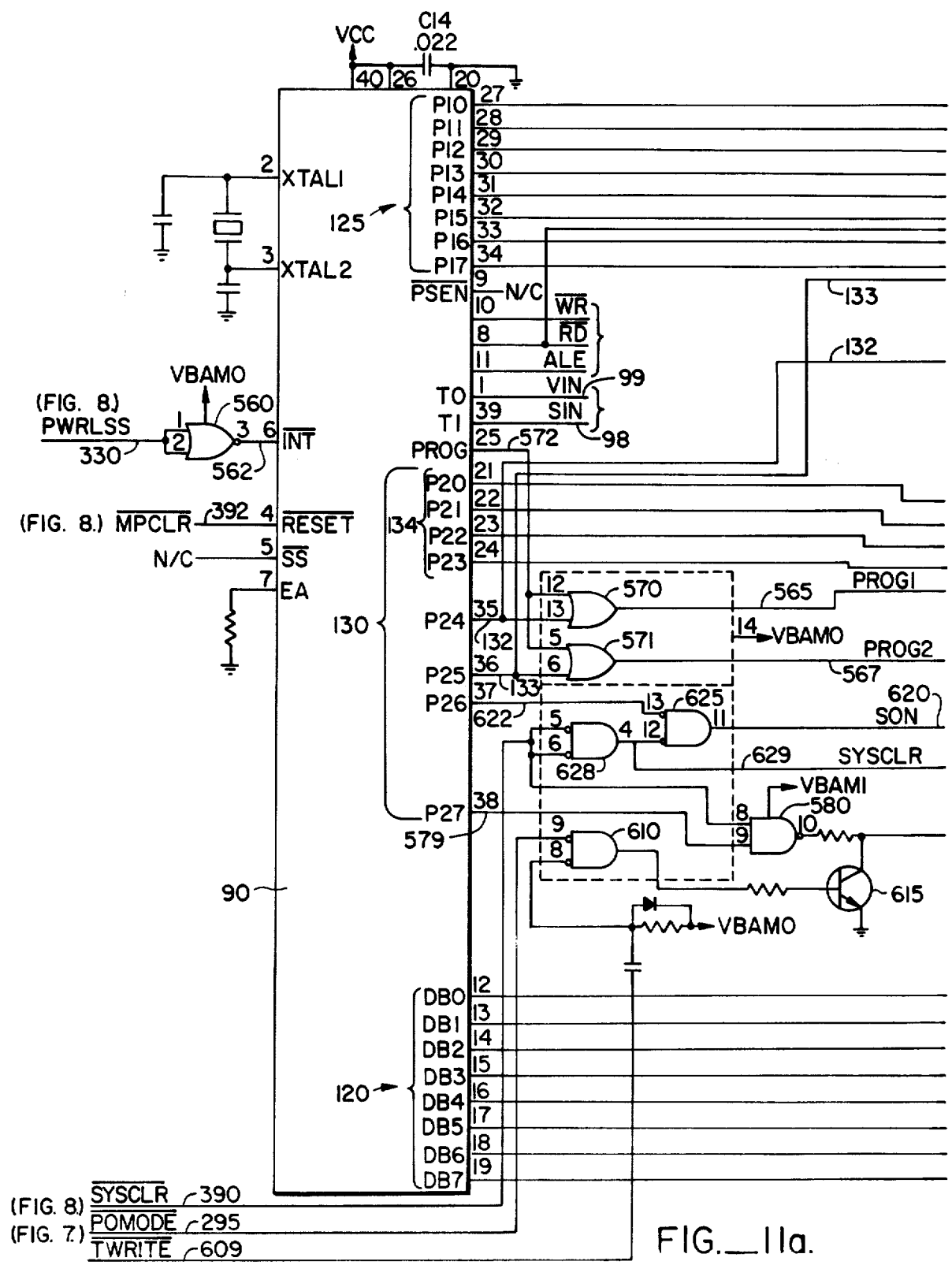
FIG._11a.

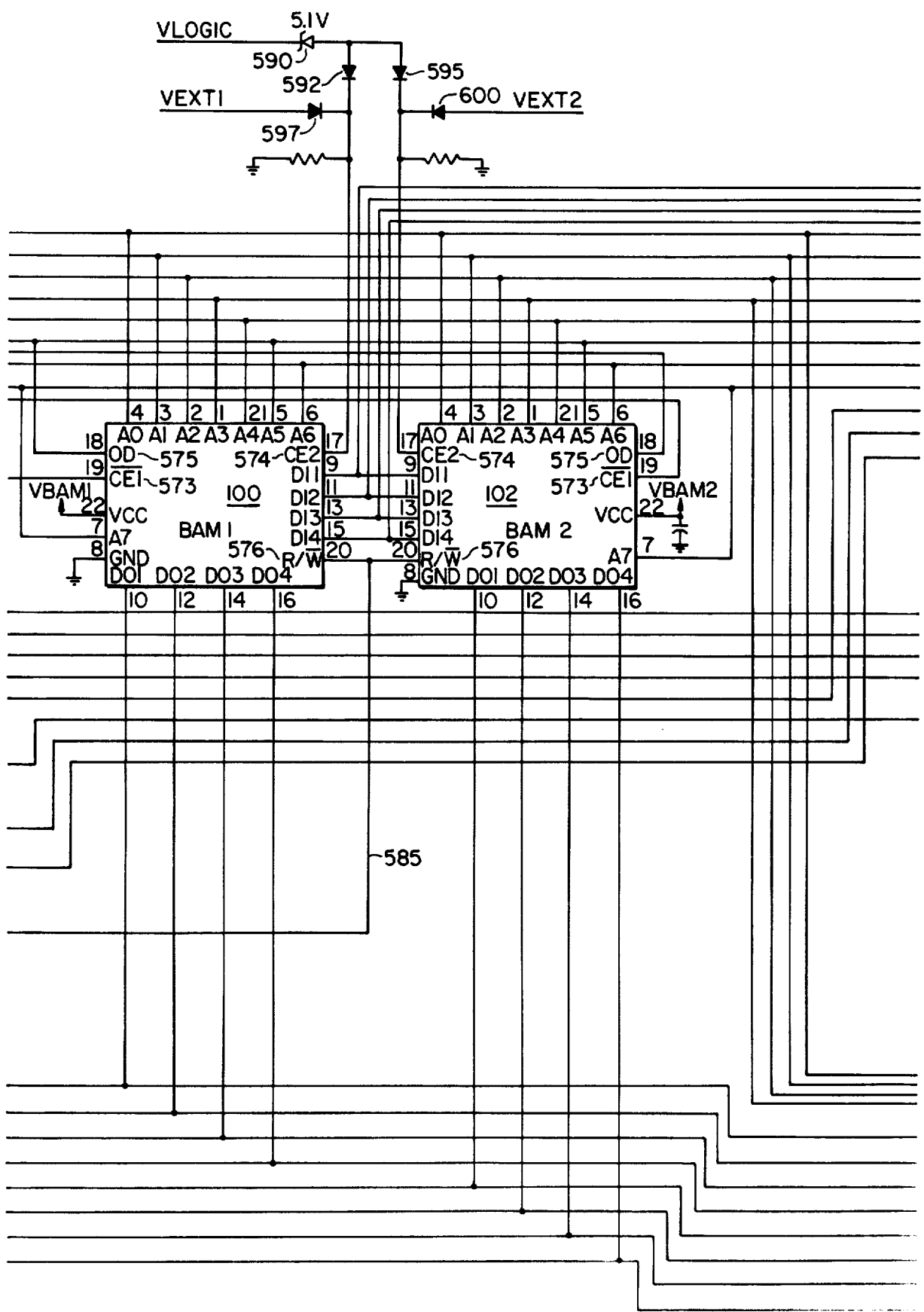
FIG._11b.

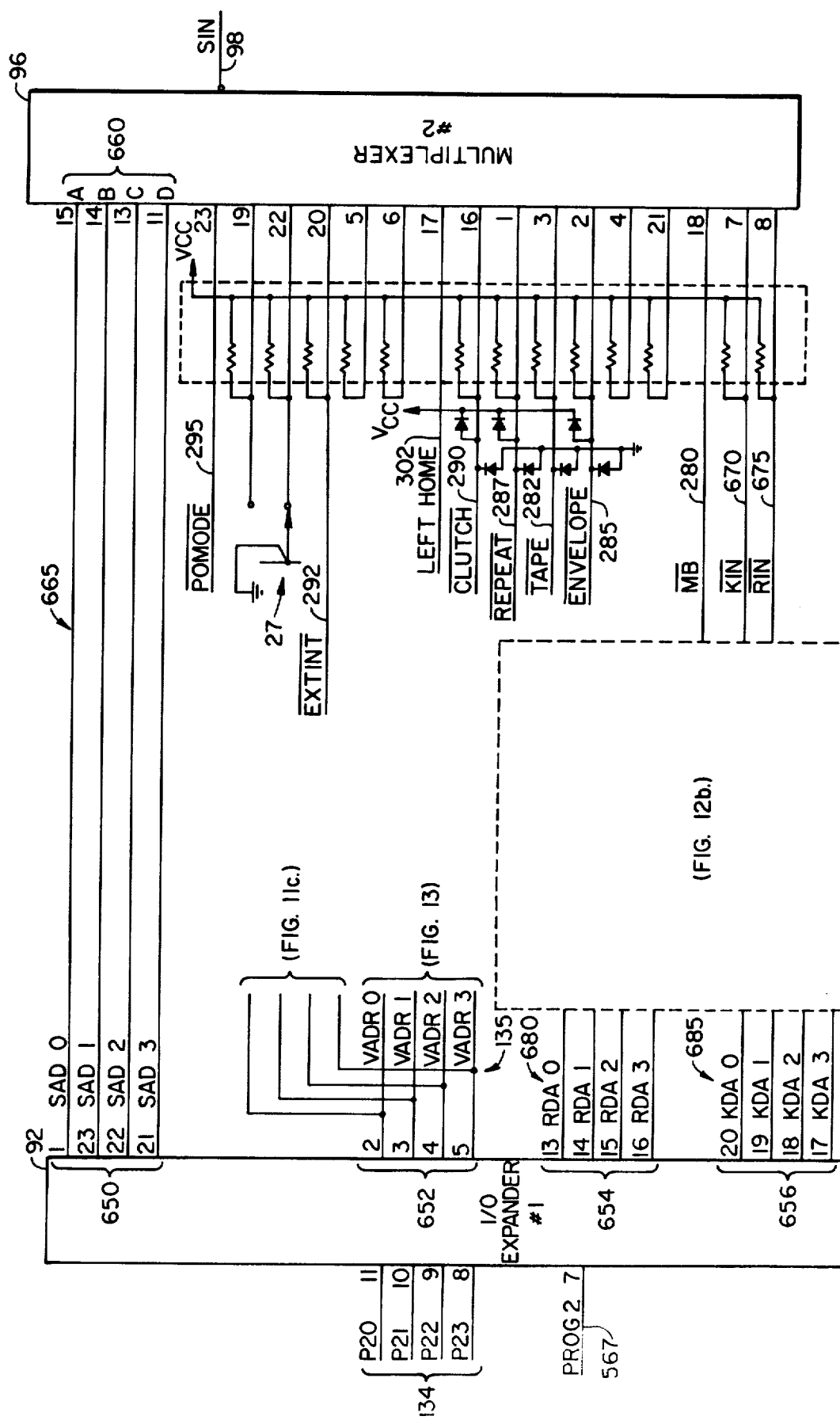
FIG._12a.

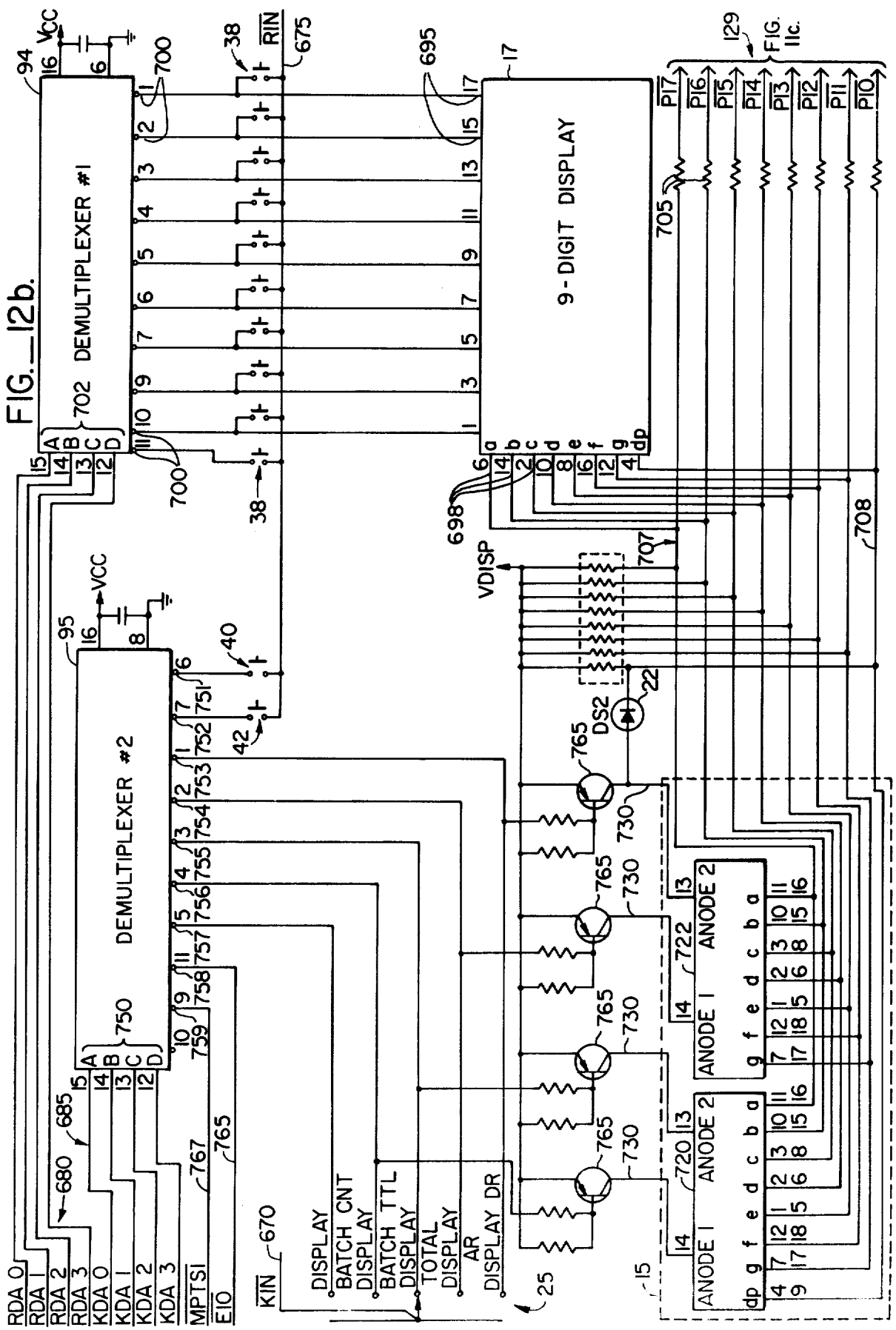

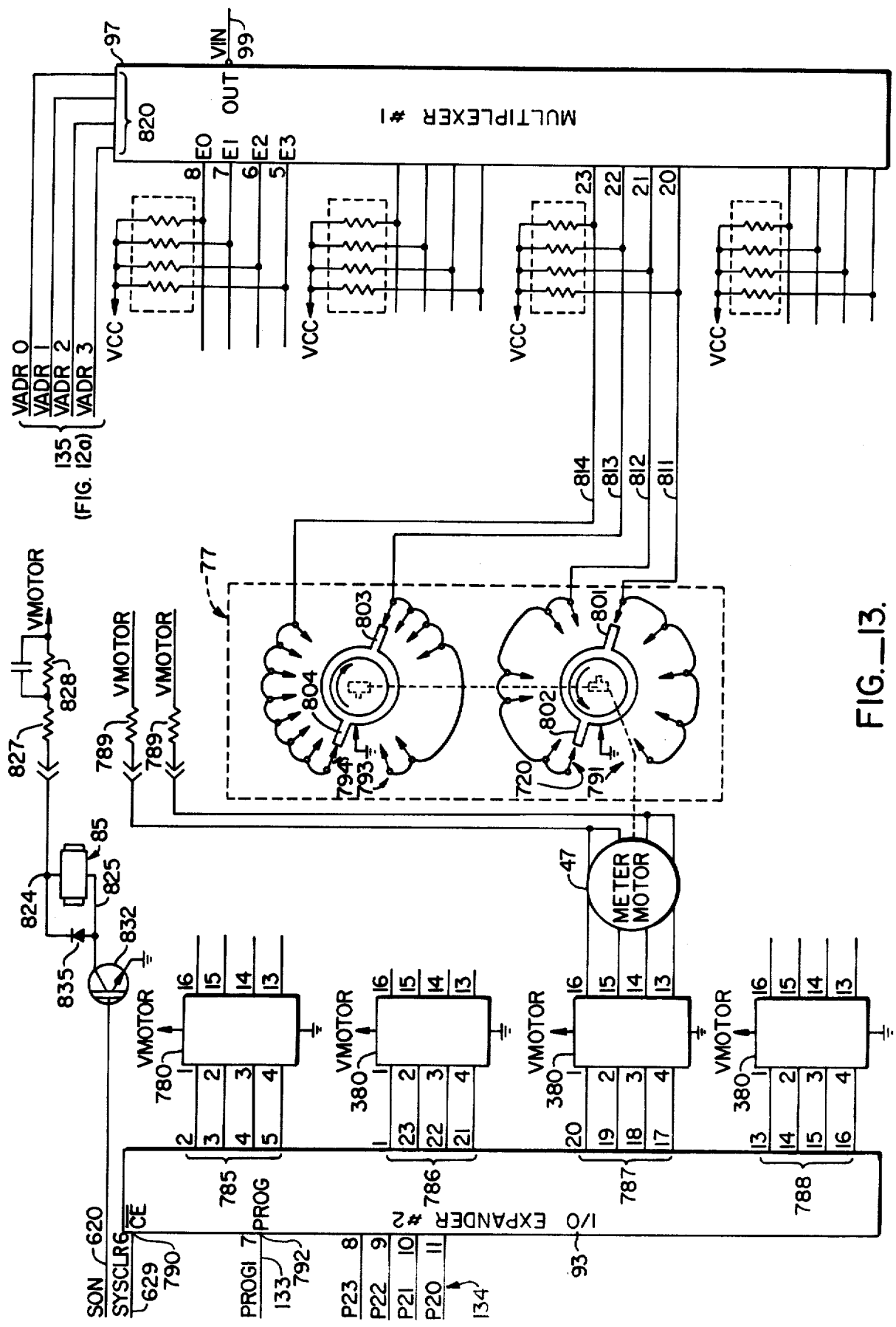
FIG._13.

| | 7 | 0 |
|---|---|---|
| 0 | R0 | |
| 1 | R1 | |
| 2 | R2 BAKSTA | |
| 3 | R3 | |
| 4 | R4 | |
| 5 | R5 | |
| 6 | R6 | |
| 7 | R7 | |
| 8 | | |
| 9 | | |
| A | | |
| B | | |
| C | STACK | |
| D | (6 DEEP) | |
| E | | |
| F | | |
| 10 | | |
| 11 | | |
| 12 | | |
| 13 | | |
| 14 | FREE | |
| 15 | FREE | |
| 16 | FREE | |
| 17 | METYPE (KEYBD ROUTINE) | |
| 18 | R0' CURR SWITCH DEBOUNCE REGISTER POINTER | |
| 19 | R1' | |
| 1A | R2' CURRENT DISPLAY POINTER | |
| 1B | R3' COUNTER FOR 4 DIGIT DISPLAY | |
| 1C | R4' CURRENT SWITCH DEBOUNCE REGISTER | |
| 1D | R5' LAST TIME CHANGE | |
| 1E | R6' THIS TIME CHANGE | |
| 1F | R7' R7 FORG | |

| | 7 | 4 | 3 | 0 |
|---|---|---|---|---|
| 20 | LSD | | | |
| 21 | | | | |
| 22 | | | | |
| 23 | 9 DIGIT DISPLAY SEGMENTS | | | |
| 24 | | | | |
| 25 | | | | |
| 26 | | | | |
| 27 | | | | |
| 28 | MSD | | | |
| 29 | SAVACC FOR FOREGROUND | | | |
| 2A | REG07 | | | |
| 2B | LAST TIME CHANGE REG07 | | | |
| 2C | REG89 | | | |
| 2D | LAST TIME CHANGE REG89 | | | |
| 2E | REGSW | | | |
| 2F | LAST TIME CHANGE REGSW | | | |
| 30 | LSD | | | |
| 31 | 4 DIGIT DISPLAY SEGMENTS | | | |
| 32 | | | | |
| 33 | MSD | | | |
| 34 | KEYSTA (KEYBD ROUTINE) | | | |
| 35 | PRSTA (PRINT ROUTINE) | | | |
| 36 | PRCTR (PRINT ROUTINE) | | | |
| 37 | IOPTR (I/O ROUTINE) | | | |
| 38 | STEPIN (0) | | | |
| 39 | STEPIN (1) | | | |
| 3A | STEPIN (2) | | | |
| 3B | STEPIN (3) | | | |
| 3C | STEPTK (0) | | | |
| 3D | STEPTK (1) | | | |
| 3E | STEPTK (2) | | | |
| 3F | STEPTK (3) | | | |

FIG._14.

BIT CONTENTS OF SWITCH REGISTERS

| REGISTER (ADDRESS) / BIT | R7FORG (IF HEX) | REG07 (2A HEX) | REG89 (2C HEX) | REGSW (2E HEX) |
|---|---|---|---|---|
| 0 | TEST (FACTORY USE) | "0" KEY | "8" KEY | DISPLAY DR |
| 1 | EXTINT | "1" KEY | "9" KEY | DISPLAY AR |
| 2 | .000 | "2" KEY | CLEAR KB KEY | DISPLAY CONTROL TOTAL |
| 3 | MB | "3" KEY | CLEAR BATCH KEY | DISPLAY BATCH TOTAL |
| 4 | LEFT HOME | "4" KEY | POMODE | DISPLAY BATCH AMOUNT |
| 5 | CLUTCH | "5" KEY | .00 | TAPE |
| 6 | "1" | "6" KEY | FCENTS | ENVELOPE |
| 7 | "1" IF CHANGE TO REG07 | "7" KEY | POMODE OR /FCENTS OR .00 | REPEAT |

FIG._15.

BIT CONTENTS OF STATUS AND PRINTER REGISTERS

| REGISTER (ADDRESS) BIT | BAKSTA 2 HEX | KEYSTA 34 HEX | PRTSTA 35 HEX | STEP IN (0-3) (38-3B HEX) | STEPTK (0-3) (3C-3F HEX) |
|---|---|---|---|---|---|
| 0 | PRINTER ONLY | | CURRENT STEPPER (0-3) | FINAL POSITION (BCD DIGIT) | NEXT POSITION (BCD DIGIT) |
| 1 | HOME/CLUTCH WAKEUP | CC | | | |
| 2 | I/O WAKEUP | | "0" IF TAPE "1" IF ENVELOPE | | |
| 3 | KEYBOARD WAKEUP | | REPEAT | | |
| 4 | REGISTER DISPLAY WAKEUP | POMODE | | | DIRECTION OF STEPPING ("1" IF INCREASE) |
| 5 | PRINTER TIMER WAKEUP | .00 | CURRENT PRINTER TASK (0-7) | STEPPER INSTRUCTION | "1" IF NEXT POSITION IS VERIFY POSITION |
| 6 | TAPE/ENVELOPE WAKEUP | FCENTS | | | "1" DENOTES SECOND TRY/FINAL POSITION WHEN BIT 5 IS "0"/"1" |
| 7 | PWRLSS | POMODE OR /FCENTS OR .00 | "0" IF NORMAL "1" IF INITIALIZING | | "1" IF NEXT POSITION IS A HALF POSITION |

FIG._16.

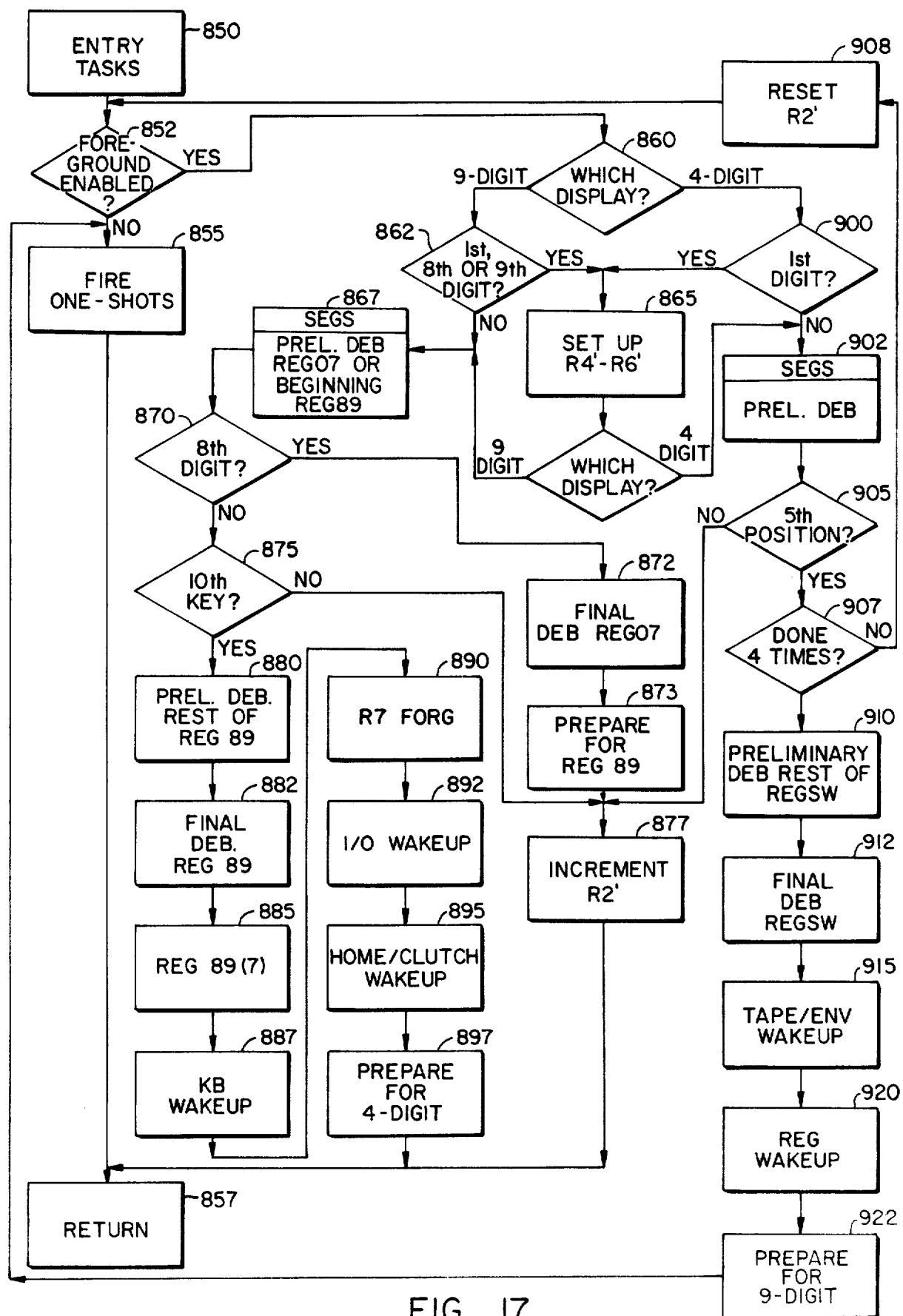
FIG._17.

BAM ORGANIZATION

| STARTING ADDRESS (HEXADECIMAL) | BAM1 0-F | BAM2 0-F |
|---|---|---|
| 00 | DESCENDING REG 1 / DR1 | DESCENDING REG2 / DR2 |
| 10 | ASCENDING REG1 / AR1 | ASCENDING REG2 / AR2 |
| 20 | CONTROL TOTAL1 / TOTAL1  (*1 *2 *3) | CONTROL TOTAL2 / TOTAL2  (*4 *5 *6) |
| 30 | BATCH TOTAL1 / B$1 | BATCH TOTAL2 / B$2 |
| 40 | BATCH COUNT1 / B#1 | BATCH COUNT2 / B#2 |
| 50 | COUNT 1 | COUNT 2 |
| 60 | KEYBOARD REG / KB  (*7) | |
| 70 | TEMP DESC REG1 / TDR1 | TEMP DESC REG2 / TDR2 |
| 80 | TEMP ASC REG1 / TAR1 | TEMP ASC REG2 / TAR2 |
| 90 | TEMP REG1 / TEMP1 | TEMP REG2 / TEMP2 |
| A0 | REGTHO1 / REGONE1 | REGTHO2 / REGONE2 |

*1 FAULT NIBBLE BAM1  *4 FAULT NIBBLE BAM2
*2 MAXPO BAM1         *5 MAXPO BAM2
*3 METYP BAM1         *6 METYP BAM2
                      *7 KBCC

FIG._18.

TEMPORARY BAM REGISTER CONTENTS AFTER SPECIFIED OPERATIONS

| OPERATION \ REGISTER | TDR1 | TDR2 | TAR1 | TAR2 | TEMP1 | TEMP2 |
|---|---|---|---|---|---|---|
| CHKTOT | DR | DR | AR | AR | AR+DR | TOTAL |
| NON-P.O. MODE KEYBOARD ENTRY | DR-KB | DR | AR+KB | AR | (AR+KB) + (DR-KB) | TOTAL |
| P.O. MODE KEYBOARD ENTRY | DR | DR | AR | AR | AR+DR | TOTAL |
| P.O. MODE ADD/SUB DR | DR±KB | DR | AR | AR | (DR±KB) + AR | (AR+DR) ± KB |

FIG._19.

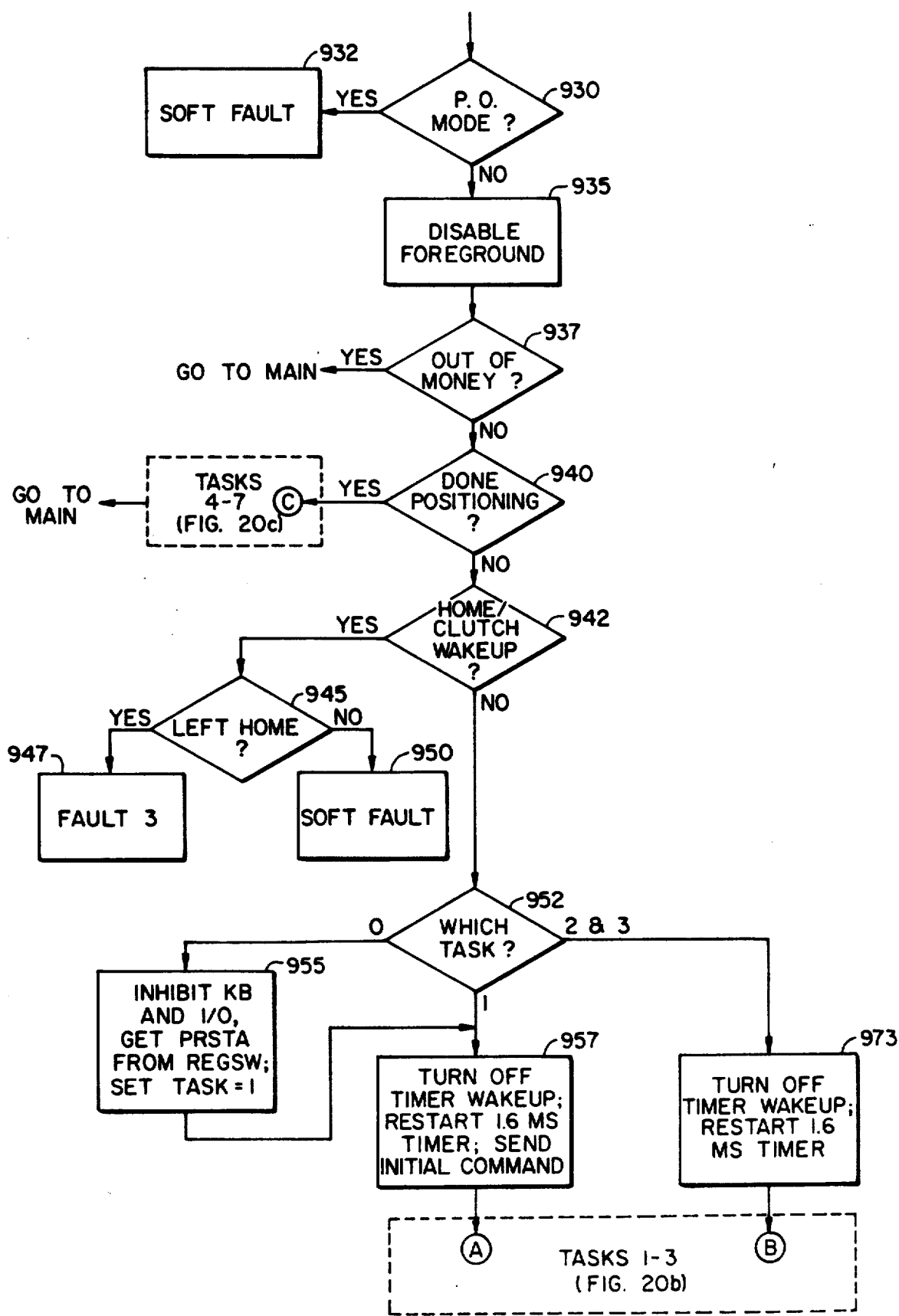
FIG._20a.

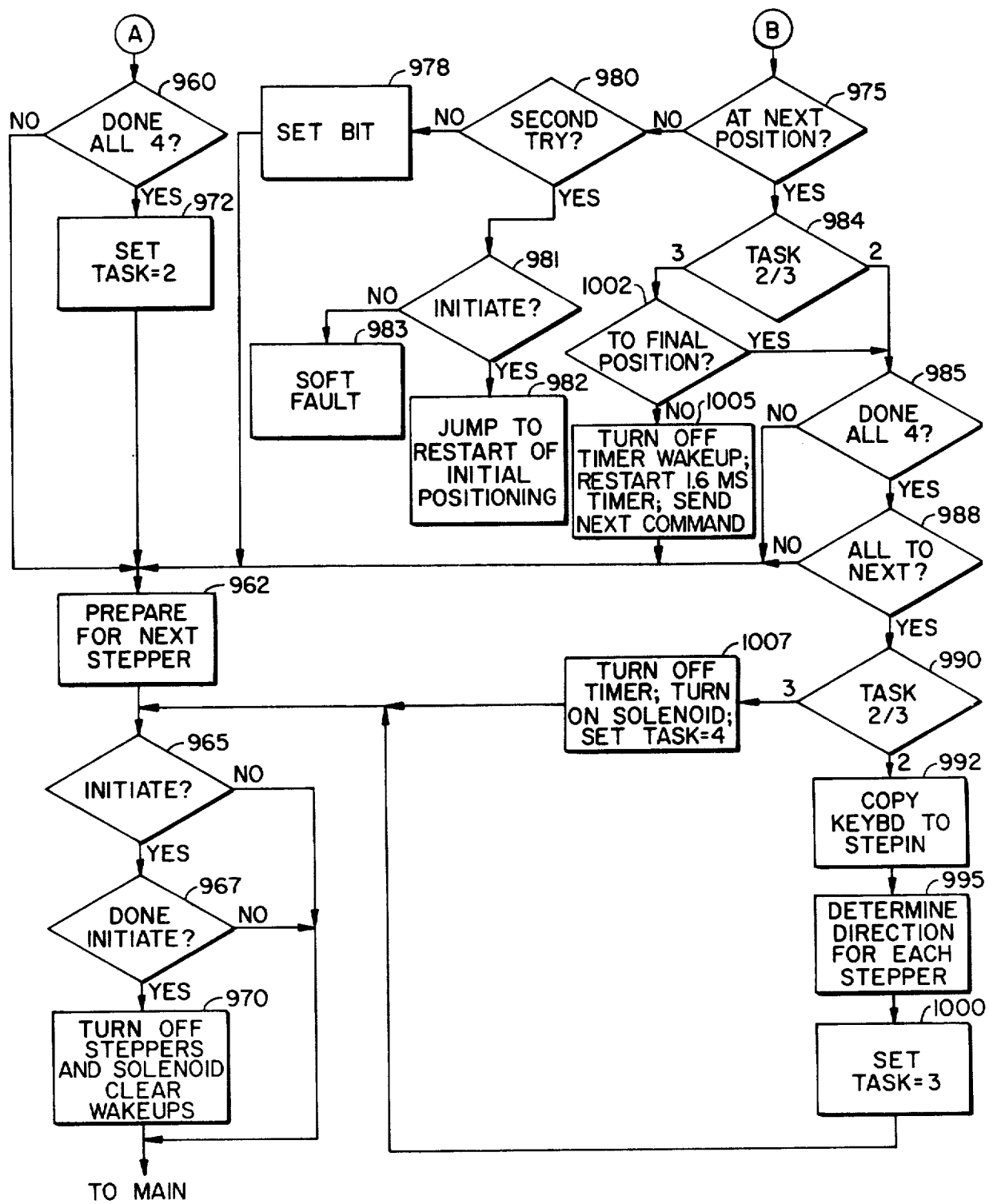
FIG._20b.

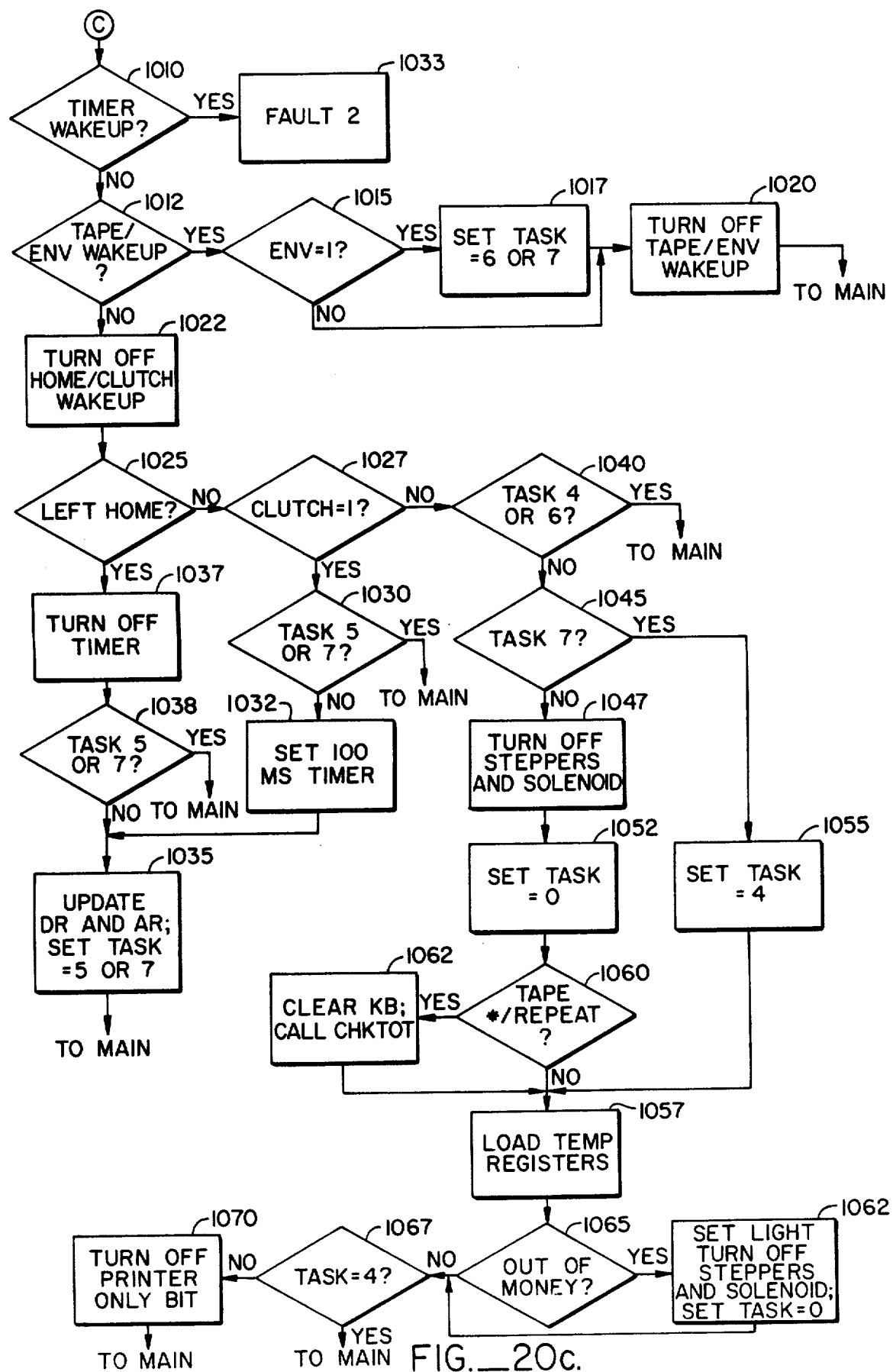
FIG._20c.

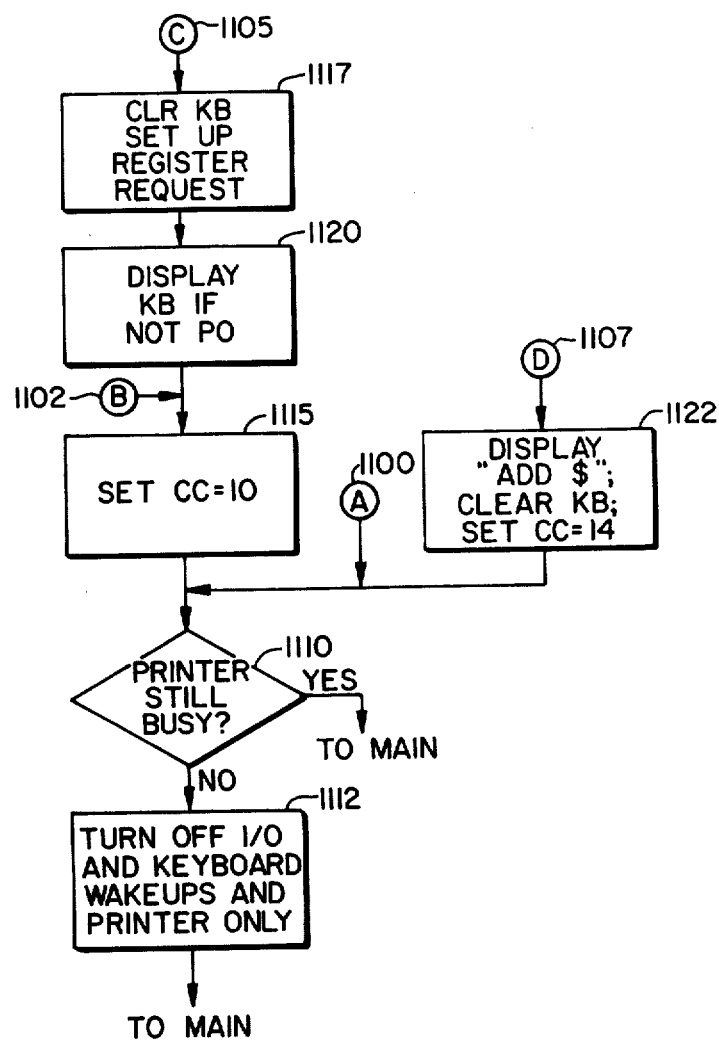
FIG._21a.

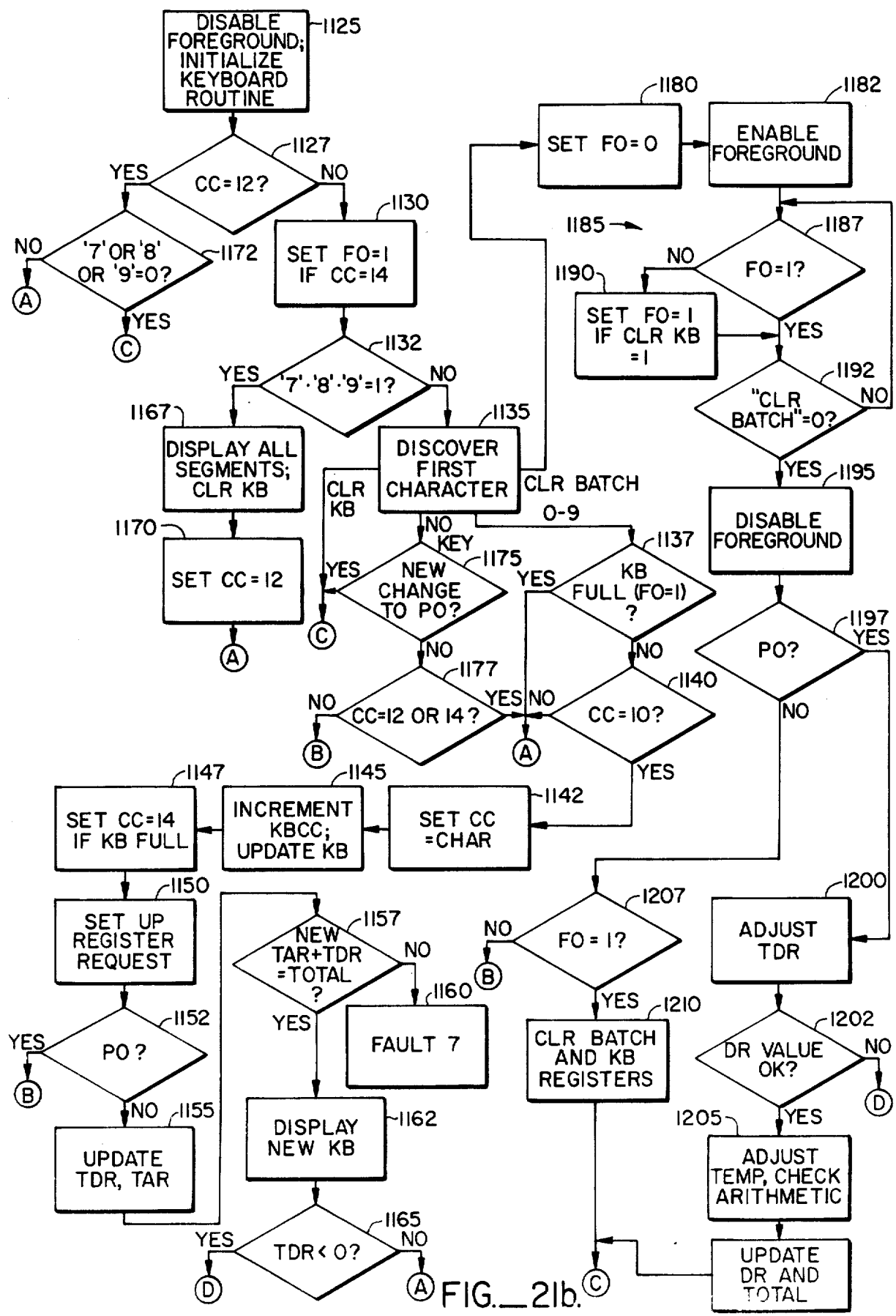
FIG._21b.

ELECTRONIC POSTAGE METER HAVING IMPROVED SECURITY AND FAULT TOLERANCE FEATURES

This is a continuation of application Ser. No. 037,578, filed May 9, 1979 now abandoned.

FIELD OF THE INVENTION

The present invention relates to a microcomputerized postage meter.

BACKGROUND OF THE INVENTION

Postage meters (hereinafter sometimes designated simply as "meters") are well-known devices for imprinting postage impressions of desired value either on a gummed tape or directly on an article to be mailed, thereby obviating the need to use postage stamps. Due to their convenience and flexibility, meters have found widespread use in commerce.

A postage meter normally includes a postage selection mechanism, a postage printing mechanism, and a plurality of internal registers for maintaining accounting information. The internal registers most commonly contain numerical values representative of the total postage paid for (control total), the total postage printed (ascending balance or ascending register), and the total postage remaining (descending balance or descending register). The information contained in the internal registers is redundant, since the ascending balance and descending balance normally sum to the control total.

Prior to using the meter a user must buy from a postal service employee a fixed amount of postage. (In this connection, the term "postal service" may refer to either a public or private mail carrying entity.) The postal service employee alters the contents of the internal registers to reflect the amount of postage paid by increasing the control total and the descending balance by this amount. To use the meter, the user first selects a value of postage to be printed, and then activates the printing mechanism. The meter may be used until the descending balance reaches a predetermined minimum (e.g., until the postage paid for has been exhausted or has reached a minimum threshold value).

It can immediately be seen that postage meters are subject to stringent security requirements to ensure that all postage actually printed has been paid for. Thus, the level of security can be measured by the difficulty of activating the meter'printing mechanism without correspondingly updating the accounting registers within the meter, and also by the difficulty of altering or losing the meter register values, whether intentionally, inadvertently, or accidentally. To this end, the print mechanism and the accounting registers are located within a secure housing, and access thereto is restricted to postal service employees.

Postage meters have traditionally been essentially mechanical devices whose mechanical design is relatively complicated due to the need to correlate operation of the postage selection mechanism, the postage printing mechanism, and the registers. In parcticular, the print mechanism must print a postage value corresponding to the value set by the user, and the appropriate internal registers must be changed by this amount. Moreover, the meter must be interlocked to disable the print mechanism when the descending balance reaches the predetermined minimum level, and to prevent more than a single printing impression from being made during a cycle of the printing mechanism. Mechanisms capable of performing these functions, of necessity, contain a large number of mechanical parts, and therefore require considerable periodic maintenance. While several decades of experience have resulted in the design and implementation of acceptably reliable mechanical postage meters, such devices have still tended to be expensive, heavy, bulky, and slow.

Recent advances in the electronic arts have suggested the desirability of replacing many of the mechanical components in a postage meter with electronic components. Thus, it is known in the prior art to provide a first-generation electronic postage meter employing discrete logic components. Such a meter is shown in U.S. Pat. No. 3,938,095 to check, Jr. et al.

By their nature, electronic postage meters rely heavily on continuous electric power during operation. However, frequent power loss of either a momentary or prolonged nature is to be expected. While power loss is not a particularly significant event for mechanical meters, it poses two distinct threats to the security of electronic postage meters. First, power loss presents a threat to the integrity of the register data which is typically stored in electronic memory units, since most electronic memories are volatile devices (i.e., they require continuous electric power to maintain their contents). This is to be contrasted with mechanical registers which are inherently nonvolatile devices. Second, the various correlation and interlocking functions are performed by electronic logic components, the performance of which can become unpredictable during a low power condition. Since this could lead to improper updating of registers, and the like, there must be provided a reliable mechanism wherein the electronic circuitry inhibits meter functioning when a low power condition is sensed. Moreover, this inhibiting must occur before the power falls to a level at which the electronic circuitry becomes unreliable.

In addition to the security requirements discussed above, a second requirement of postage meters, called "fault tolerance", comes into play when mechanical registers and other functions are replaced by electronic components. Fault tolerance refers to the meter's ability to maintain security in view of individual component failure. A postage meter is likely to be used in a variety of settings that may subject the components to environmental rigors such as mechanical shock, stray electric fields, and wide temperature variations, any of which may cause an electronic, mechanical, or electromechanical component to fail.

It is apparent that the large number of components in the first-generation electronic postage meters employing discrete logic elements (i.e., transistors, diodes, etc.) tends to render such meters insufficiently reliable for postal service approval. A further difficulty with electronic postage meters employing discrete logic components is that the features and capabilities of the meter cannot be altered easily once the meter is constructed. Thus, like their mechanical counterparts, such meters cannot readily be adapted to new applications.

In recognition of the above problems, first-generation electronic postage meters employing discrete logic have given way to second-generation electronic postage meters employing large scale integration microcomputer architecture. An example of such a second-generation stand-alone postage meter is disclosed in U.S. Pat. No. 3,978,457 to Check, Jr. et al., employing a microcomputer system which monitors the printing and other functions of the meter, and which supervises and maintains the required accounting information. A microcomputerized postage meter contains a smaller number of components than its discrete component counterpart, and is therefore likely to have improved fault tolerance characteristics. The fault tolerance can be further enhanced by the capability possessed by such a meter of verifying its own functions. Nevertheless, fault tolerance remains a potentially vexing problem because the very components that are used to check for failure are themselves subject to failure.

In spite of the numerous potential advantages of electronic postage meters over their mechanical predecessors, and further in spite of the expanded capability of microcomputerized postage meters, efforts to design an electronic postage meter having sufficiently high levels of security and fault tolerance to obtain postal service approval have been generally unsuccessful to date.

SUMMARY OF THE INVENTION

The present invention is a microcomputerized postage meter that provides sufficiently high degrees of security and fault tolerance to make the meter suitable for postal service approval.

Broadly, the postage meter of the present invention includes a microcomputer system, a keyboard or other suitable input means for entering data and instructions into the microcomputer, a display unit for allowing the operator to determine the status of particular registers, and a postage printing mechanism. The printing mechanism and the electronic components are located within a secure housing, and unauthorized access is impossible without physical destruction of parts of the housing. The housing mounts on a conventional meter base which performs the various paper handling functions and contains the power supplies.

The meter maintains data security under low power conditions by the use of functionally nonvolatile memory units. Register and other data which must survive normal and abnormal losses of power to the meter electronics are stored in dual redundant battery augmented memories (hereinafter designated BAMs). The BAMs are also used to store historical information for maintenance purposes (e.g., total usage of print mechanism), information relating to particular features or options (e.g., fractional cents), batch information (number of pieces and dollar amounts), and failure information (discussed more fully below). The BAMs are mutually independent, and each BAM includes a low power CMOS memory and a long life (5 years or more) battery. While each BAM can be read independently of the microcomputer, writing of new data into each BAM can only occur under microcomputer program control.

The meter maintains the integrity of its functioning under low power conditions by generating and responding to two timed signals when a low power condition is sensed. A first signal, designated "SYSCLR" (system clear), has the effect of inhibiting all meter functions that could have an effect on the printing of postage or the register values in the BAMs. A second signal, designated "MPCLR" (microprocessor clear), inhibits execution by the microcomputer. The generation of these two signals in a particular time-ordered manner prevents spurious operation during power up and power down periods.

When the supply voltage supplied to the meter falls below a predetermined threshold deemed necessary to ensure continued reliable functioning of the electronic components, a portion of the circuitry initiates a graceful power down sequence. After a sufficient time to allow completion of any ongoing BAM register updates (about 20 milliseconds), a SYSCLR signal is generated, i.e., SYSCLR goes true, inhibiting writing to the BAMs, and disabling the print mechanism. Then, after a delay (about 1 millisecond), a MPCLR signal is generated, i.e., MPCLR goes true, and the microcomputer is disabled. A capacitor within the meter retains sufficient charge at a voltage above that required by the electronic components to ensure that the circuitry operates reliably during the power down sequence.

An analagous sequence occurs when power is first applied to the meter circuitry during a power up cycle. When the supply voltage to the meter electronics is non-zero but still below the predetermined threshold level, MPCLR and SYSCLR go true. After a sufficient interval after the time that the voltage has risen to the predetermined threshold value to ensure reliable microcomputer operation (about 50 milliseconds for the particular microcomputer used), MPCLR goes false, which allows the microcomputer to start executing an initialization routine. Then after a delay (about 2 milliseconds) SYSCLR goes false to permit normal meter functioning.

The basic operating philosophy of the postage meter is to maintain security under normal operating conditions by having the microcomputer supervise and verify the various meter functions.

Printing is strictly supervised by the microcomputer. The meter employs a print mechanism comprising a print head which includes a plurality of print wheels, and a plurality of stepper motors corresponding to the plurality of print wheels, each motor controlling the positioning (indexing) of an associated one of the plurality of print wheels. Each stepper motor has verification means for generating a digital code, preferably binary coded decimal (BCD) code, corresponding to the print wheel position. Locking means, such as a solenoid, under exclusive control of the microcomputer maintains the print head locked up in the home position except when printing is to be carried out in accordance with instructions from the microcomputer. Before freeing the print head for printing, the microcomputer verifies that the print wheels are in the positions corresponding to the desired amount of postage to be printed.

Changes to the register values in the BAMs can only occur under control of the microcomputer. In regular use, the meter is in a condition designated "mail room" mode wherein the only instructions available to the operator for changing the register values stored in the BAMS are the instructions for initiating a postage printing cycle. The effect of the print cycle is to decrement the descending register and increment the ascending register by the amount of postage printed. Register updating occurs only upon the receipt of a signal from the base that a clutch in the motor that drives the print head had been pulled or an internal signal that the print head has left its home position. As discussed above, the print head is freed only after the print wheel positions have been verified. Only authorized personnel can cause the microcomputer to execute a series of instructions to increase the control total value and descending register value by an amount corresponding to an amount of postage that is being added to the meter. Such instructions can only be executed when a mode-changing switch is actuated to switch the meter to a condition designated "post office" mode. In order to actuate the mode-changing switch, a seal must be broken and the switch unlocked with a special key available only to authorized personnel. The meter is not mounted on a base in the "post office" mode since no printing is to occur but rather, the meter is provided with external power to operate the electronic control circuitry.

All updating of register values, whether at the initiation of the print cycle or at the time of purchase of additional postage, occurs according to a checked arithmetic algorithm. The basic arithmetic constraint is that the ascending and descending registers sum to the control total. The mechanics of the checking and the updating differ somewhat, depending on whether the meter is in the "mail room" or "post office" mode. In both cases, an extra "temporary" copy of the ascending and descending register values and control total is stored in the BAMs, in addition to the redundant "permanent" values. A consistency check is made to ensure that the register values in one BAM agree with the corresponding values in the other BAM. In the "mail room" mode the temporary values are updated as each character is entered on the keyboard; in the "post office" mode updating of the temporary registers occurs only after the entire keyboard entry is complete. At each update of the temporary register values, the values are checked for adherence to the arithmetic constraint. Updating of the permanent registers occurs during the print cycle in the "mail room" mode and in response to a particular keyboard sequence in the "post office" mode. The updated permanent registers are then checked for agreement between BAMs and for adherence to the arithmetic constraint.

It is apparent that the use of redundant BAMs, the maintenance of temporary register values in the BAMs, and the manner of updating the BAM registers prevent the loss of correct register values in the event of many types of malfunction. For example, if the microcomputer where to cease execution while updating the permanent registers in the BAMs in either the "post office" or "mail room" mode, the temporary registers would still provide sufficient redundant information to permit retrieval of the correct register values.

However, once a malfunction has occurred, the meter no longer possesses the redundancy necessary to maintain security in the event of a further malfunction. Accordingly, there is provided a mechanism for disabling the meter once a first malfunction is detected. This results in a meter that possesses a level of fault tolerance wherein security is maintained in spite of a single malfunction. The meter is still susceptible to loss of the correct register values if two independent malfunctions occur in a particular complementary way (e.g., loss of power to one BAM and memory failure of the other BAM; simultaneous loss of power to both BAMs; compensating arithmetic errors in both of the BAMs). Such combinations of malfunctions are extremely rare since the individual malfunctions are basically independent occurrences that are themselves rare.

The meter disabling mechanism includes dual redundant flip-flops which are set to a "faulted" state upon detection by the microcomputer of a failure condition. These flip-flops are powered by the BAM batteries. The setting of these fault flip-flops lights an indicator lamp and generates a SYSCLR signal to inhibit all meter functions that could have an effect on the register values in the BAMs. In addition, the setting of the fault flip-flops generates an MPCLR signal to cause the microcomputer to cease execution. Setting of the fault flip-flops is inhibited by the presence of a SYSCLR signal, so that the fault flip-flops cannot be set during power up and power down cycling. The fault flip-flops, once set, hold SYSCLR and MPCLR true whenever power is supplied to the meter. They cannot be reset except by physical access to the meter interior, which access is only available to authorized personnel at the factory.

The fault flip-flops are also set when the microcomputer fails to properly execute its own operating program. Under proper conditions, the microcomputer periodically generates a signal which triggers two independent monostable multivibrator circuits, preferably retriggerable one-shots, to maintain a particular logic level on the one-shot output. The microcomputer responds to the detection of a fault condition by not triggering the one-shots. When there appears on the one-shot output a logic level that corresponds to the failure of the microcomputer to generate this signal, the fault flip-flops are set. In addition to programmed failures to trigger the one-shots, any circumstance (such as microcomputer failure) that prevents the microcomputer from triggering the one-shots has the effect of causing the meter to fault. Thus, the mechanism for setting the fault flip-flops exploits the microcomputer's ability to diagnose failures but may also be activated should the microcomputer itself fail.

Adherence of the register values to the arithmetic constraint, and consistency between the BAMs, as described above, are considered absolute prerequisites to continued meter operation. Thus if an arithmetic check yields inconsistent results, or if corresponding registers in the two BAMs disagree, the meter faults after writing an appropriate failure code to the BAMs. All writing to the BAMs is verified, and an error causes the meter to fault, preceded by the writing of an appropriate failure code.

During the printing operation, the microcomputer and associated logic elements test for various indications of malfunction of the print value setting and printing mechanisms. In particular, if during a printing operation the print head leaves its home position before the print wheels are positioned or the print head fails to leave its home position within a predetermined maximum time period (100 milliseconds) of the receipt of a clutch signal, the meter faults. In such cases, a numeric code representative of the particular problem detected is written to the BAMs prior to deactivation of the meter.

Other types of malfunction do not pose an immediate threat to security, and tend to be self-curing or one-time occurrences. These situations are handled by turning off the displays and stepper motors, locking the print solenoid, and causing the microcomputer to execute a trivial wait loop while still continuing to fire the one-shots. This condition is designated a "soft fault". The typical cause of a soft fault is some sort of mistake which necessitates suspending operation to prevent a second mistake which could cause an error. The mistake may arise from operator error, base malfunction, dirt, or noise. An example of soft fault is the apparent failure of a print wheel to move from one position to an adjacent position within a predetermined maximum time period (12.8 milliseconds). In many instances, the cause might be due to imperfect operation of the verification means, such as poor electrical contact due to dirt. In such a case, reinitializing the meter which causes the motors to be stepped through their entire range would cure this problem. Another example of a soft fault is the detection of a clutch signal when it is not expected. This could be caused by a malfunction in the base or it could result from improper paper handling by the operator. Again, reinitializing the meter would cause this problem to go away. A further example of a soft fault is the inability to verify a BAM address. Since the BAM address lines communicate outside the meter housing, they are susceptible to electrical noise which could cause a bad address verification. Again, this problem is likely to be intermittent in nature and does not pose a threat to security so long as no attempt is made to write to the BAMs.

Yet a further potential threat to the meter's security is present if the mode-changing switch malfunctions, giving a spurious indication to the microcomputer that the meter is in the "post office" mode since this could allow an unauthorized (unpaid for) increase of the control total and descending registers. To prevent such an occurrence, the microcomputer checks the mode-changing switch during initialization and at the beginning of a print cycle. If the meter is found to be in the "post office" mode while apparently mounted on a base at either of these times, a soft fault condition is considered to have occurred. One possible cause of such a condition is if a postal service employee actuates the mode changing switch while the meter is mounted on a base. So long as operation is suspended, no threat to security exists, and the soft fault condition is cured by having the postal service employee reinitialize the meter under external power (meter off base) or on the base but in the "mail room" mode.

During initialization, the microcomputer checks to make sure that no nonzero failure codes have been written to the BAMs. Once an error code has been written to the BAMs and the meter has faulted, it should be impossible to initialize the meter since the fault flip-flops hold MPCLR true when power is supplied. Thus, detection of a nonzero failure code is a possible indication of a BAM failure or an inability to read a good zero from the BAMs, and causes the meter to fault. Due to the nature of the error, no attempt is made to write a failure code.

Once the meter has been set to a "faulted" state, the BAM contents may still be read out independently of the microcomputer. During this time, the microcomputer is prevented from accessing the BAMs. This is accomplished by allowing power necessary to read the BAMs to be supplied to the BAMs without supplying power to the microcomputer. Moreover, even if the microcomputer is powered, MPCLR prevents it from executing instructions and SYSCLR isolates it. The various register values and the fault code then allow a reconstruction of the proper register values.

For a further understanding of the nature and advantages of the invention, reference should be had to the ensuing detailed description taken in conjunction with the accompanying drawings.

BRIEF DESCRIPTION OF THE DRAWINGS

FIG. 1 is a perspective view of the exterior of a microcomputerized postage meter according to the present invention;

FIG. 2 is a perspective view of part of the print mechanism located within the housing of the meter;

FIG. 3 is a schematic block diagram of the electronic meter system;

FIG. 4 is a system flow chart illustrating the general operation of the invention;

FIG. 5 is a circuit diagram of the external power levels that are communicated from the base to the meter;

FIG. 6 is a circuit diagram of signals communicated from the base to the meter;

FIG. 7 is a circuit schematic of circuitry for generating certain internal signals within the meter;

FIG. 8 is a circuit schematic of the power surveillance and system reset circuitry of the present invention;

FIG. 9 is a circuit schematic of the circuitry that inhibits meter functioning upon detection of a fault condition;

FIG. 10 is a timing diagram illustrating the voltage levels responded to by the power surveillance circuitry of FIG. 8, and the signals generated by the system reset circuit of FIG. 8;

FIGS. 11a, 11b, and 11c, taken together form a circuit schematic illustrating the microcomputer and BAM control circuitry;

FIG. 12a and 12b, taken together, form a circuit schematic illustrating the microcomputer circuitry for refreshing the displays and reading the switches;

FIG. 13 is a circuit schematic illustrating circuitry for controlling the print wheel motors and reading the verification contacts;

FIG. 14 is a schematic illustrating a suitable memory allocation of registers required by the operating program of the microcomputer;

FIG. 15 is a schematic illustrating a suitable bit allocation for the switch registers;

FIG. 16 is a schematic illustrating a suitable bit allocation for the status and print routine registers;

FIG. 17 is a flow chart of the foreground routine;

FIG. 18 is a schematic illustrating the organization of the BAMs and the memory allocation of register values stored therein;

FIG. 19 illustrates in tabular form the temporary register contents after various operations;

FIGS. 20a, 20b, and 20c, taken together, form a flow chart of the print task routine;

FIGS. 21a and 21b, taken together, form a flow chart of the keyboard task routine.

DESCRIPTION OF THE PREFERRED EMBODIMENT

Turning now to the drawings, FIG. 1 is a perspective view of the exterior of a postage meter 5 according to the present invention. Meter 5 includes an exterior housing 10 for containing a print mechanism and electronic control system described in detail below. In operation, meter 5 is installed on a mailing machine base, not shown, which contains power supplies for the meter, performs paper handling functions (envelopes or tapes), communicates synchronizing signals to the electronic control system, and provides mechanical power for activating (but not setting) the print mechanism. Since the mailing machine base comprises a conventional ancillary device, a detailed description of the elements thereof is omitted to avoid prolixity.

The exterior components of meter 5 generally include a control panel and a door behind which is a postal service employee's panel. The control panel includes a keyboard 12, displays 15 and 17, indicator lights 20 and 22, and selector switches 25 and 27. The postal service employee's panel includes a remote power connector 28 for powering the meter when it is removed from a base, and a keylock operated mode changing switch 30 which, when actuated, places the meter in a "post office" mode to permit the postal service employee to change the register values to reflect a purchase of additional postage. Access to connector 28 and switch 30 requires the breaking of a seal 31 and subsequent sliding of door 11.

The plurality of keyboard keys, switches 25, 27, and 30, and displays 15 and 17 allow the operator or postal service employee to communicate with the internal electronic control system and to specify the necessary control signals for operation of the electronic control system and the print mechanism. Meter 5 may also operate under control of external devices (e.g. an electronic weighing station) and thus includes suitable connections for communicating electrical signals to the electronic control system within housing 10. Hereinafter, the term "switches", when used generally, will be taken to include the above switches and keys, the base synchronization signals, and signals from external devices.

Keyboard 12 comprises a calculator configured digit field including ten numbered keys 38, and special function keys 40 and 42, designated clear KB and clear batch, respectively. Data entry is effected by manually actuating numbered keys 38 in a sequence corresponding to the desired entry. The most significant digit is entered first, normally with a maximum dollar entry capacity of four digits (99.99 or 9.999 if a fractional cents meter). Attempts to continue entry beyond the four digit maximum are ignored. This entry capacity expands to up to eight digits when the meter is in the "post office" mode, the maximum number of digits being a preset parameter.

Display 15 is preferably a four-digit numeric display having characters sufficiently large to be readily visible in normal operation. A character height of about 0.6 inches is suitable. As data is entered via keys 38, it is displayed on display 15. As values are keyed in, they enter the right-most digit and are shifted left for each valid subsequent keyboard entry. Depression of clear KB key 40 clears the keyboard entry and display 15. Simultaneous depression of clear batch key 42 and clear KB key 40 initializes internal batch count and batch dollars registers. Display 17 is preferably a nine-digit numeric display and is used for displaying register values. Since this display is generally used less often than display 15, a smaller character size (e.g., approximately 0.125 inches) than that used for display 15 is suitable. Five position slide switch 25 allows the user to select an internal register to be displayed on display 17. In particular, descending register value, ascending register value, control total value, batch dollar amount, and batch count may be displayed. Two-position selector switch 27 has effect only if meter 5 has been pre-programmed as a "fractional cents" meter. In effect, switch 27 allows the operator to overide the fractional cents aspect during keyboard entry so that the last digit entered corresponds to cents rather than tenths of a cent.

When lit, indicator lights 20 and 22 serve to warn that operator that a condition has occurred which makes it necessary to at least temporarily suspend operation of the meter. Indicator light 20, designated "Service", is lit when the meter has been internally set to a faulted state. When light 20 is lit, the meter is inoperative, and must be returned to the factory before it can be used again. In addition, no set of keyboard entries or sequence of powering the meter can restore operation, and access to the housing interior, possible only at the factory, is required to place the meter in operative condition. Indicator light 22, designated "Add $", is lit when the amount of postage entered would cause the descending register value to become negative upon printing. Depressing "clear entry" key 40 extinguishes light 22 and allows subsequent meter operation at postage values which will not cause the descending register value to become negative.

The amount of postage available for printing may be changed by a postal service employee by placing meter 5 in the "post office mode". This is possible only when the postal service employee breaks seal 31 on switch 30, and enables movement of switch 30 to the "post office mode" position by actuation of keylock 32. When this occurs, keys 40 and 42 and switch 25 take on different functions. When switch 25 is moved to either of the batch register display positions, nine-digit display 17 functions as a keyboard verification display. Keyboard keys 38 retain their normal function of data entry, but special keys 40 and 42 allow the postal employee to change the values of the accounting registers. In particular, depression and release of clear batch key 42 causes the keyboard entry to be added to the descending register and the control total values. If clear KB key 40 is depressed while clear batch key 42 is also depressed, the keyboard entry is subtracted from the descending register and control total values when "clear batch" key 42 is released.

FIG. 2 is a perspective view of portions of the print mechanism located within housing 10 of meter 5. The print mechanism comprises a print head having a plurality of print wheels, a plurality of stepping motors (hereinafter sometimes referred to as steppers) to independently set the print wheels, and means for moving the entire print head to a printing position without disturbing the print wheel settings. FIG. 2 shows the print wheel setting means for a single digit. A print wheel 43 having a plurality of value indicating print surfaces 44 is driven by a stepping motor 45. Additional motors 46, 47, and 48, while not shown in FIG. 2, are shown schematically in FIGS. 3 and 13. Stepping motor 45 drives a gear 49 which engages a rack 50. Rack 50 is rigidly connected to a drive yoke 52 which carries a rotatably mounted drive ring 55. Drive ring 55 is slidably mounted on a rotatable bar 57 which has a channel 60 along its length. A rod 62 is disposed within channel 60, being coupled to drive ring 55 at one end and terminating in a rack portion 65 at the other end. Print wheel 43 has a gear 68, and rack 65 drives print wheel 43 through gear 68 and an idler gear 70.

Thus, rotation of gear 49 on the output shaft of motor 45 causes movement of rack 50 along the direction of bar 57. Movement of drive yoke 52 is transmitted through rod 62 and idler gear 70 to gear 68 and print wheel 43. Motor 45 is coupled to a position sensor 75, which in the preferred embodiment comprises verification contacts for generating a binary code representative of the position of an internal wiper connected to the motor shaft. Additional position sensors 76, 77 and 78 are associated with motors 46, 47, and 48, respectively, and while not shown in FIG. 2, are shown schematically in FIGS. 3 and 13.

It should be understood that a separate subassembly comprising a stepping motor, a motor gear rack, a position sensor, a drive yoke, a drive ring, a rod, a print wheel rack, an idler gear, and a print wheel substantially similar to elements 45, 50, 75, 52, 55, 62, 65, 70, and 43 is provided for each digit that can be printed. Thus, in the preferred embodiment where four digits may be printed, there are four such subassemblies. However, there is only one channeled bar 57, channel 60 being sized to accomodate four rods (including rod 62) in a side by side configuration.

Printing occurs by a rotation of bar 57, the mechanical power being supplied by the base. It should be noted that the drive yokes, while movable along bar 57, are prevented from rotating. Rather, bar 57 rotates independently. The print head (which includes the print wheels) is maintained in a fixed relationship with respect to bar 57 so that rotation of bar 57 brings the print head from a normally upwardly facing disposition into a downwardly facing position for printing, during which the print wheels are exposed at an opening in the bottom of housing 10. A solenoid 85, shown schematically in FIG. 12 prevents movement of the print head in the absence of a specific print enabling signal.

FIG. 3 is an electrical schematic showing in functional block diagram form the electronic circuitry located within meter 5. Whenever meaningful, reference numerals corresponding to those associated with the physical representation of the same components in FIGS. 1 and 2 are used.

The central element in the meter electronic circuitry is a microcomputer 90 having contained program memory, working memory, and processing capabilities. During operation, microcomputer 90 is responsible for performing several functions, including periodic refreshing of the displays, periodic sampling of all the switches, communication with external devices, detection of synchronizing signals from the base that signify the initiation of a print cycle, initiating and verifying print wheel setting, and performing accounting functions. Since microcomputer 90 is required to communicate with a relatively large number of peripheral devices, it operates in conjunction with input/output (hereinafter designated I/O) expansion circuitry. The I/O expansion circuitry includes I/O expanders 92 and 93, demultiplexers 94 and 95, and multiplexers 96 and 97. As will be described in detail below, I/O expander 92 provides signal paths, via demultiplexers 94 and 95 and multiplexer 96, between microcomputer 90 and the displays and switches. The switch status is communicated to microcomputer 90 on an output line 98 of multiplexer 96. In a like fashion, I/O expander 93 allows microcomputer 90 to send signals for driving the stepping motors, while multiplexer 97 allows microcomputer 90 to receive information on a line 99 from the motor position sensors.

In addition to the switches, displays, motors, position sensors and I/O expansion circuitry described above, the circuitry includes dual redundant battery augmented memories 100 and 102 (BAMs). The BAMs are used to store information which must survive normal and abnormal losses of electrical power to the meter. This includes register data (ascending register value, descending register value, control total value), batch count information, and failure information, all to be discussed in greater detail below.

The circuitry also includes power surveillance circuitry 105 for detecting what is anticipated to be a low power situation, and system reset circuitry 110 that responds to low power conditions by generating timed signals, designated "SYSCLR" (system clear) and "MPCLR" (microprocessor clear), in a particular time ordered manner for a graceful power up or power down sequence. Dual redundant fault flip-flops 111 and 112 are coupled to the system reset circuitry to inhibit meter functioning once the flip-flops are set to a "faulted" condition. Flip-flops 111 and 112 are maintained in a non-faulted state by the outputs of dual redundant retriggerable one-shots 113 and 114, respectively. During operation, so long as no failure condition is detected, microcomputer 90 periodically sends a signal to one-shots 113 and 114 to prevent flip-flops 111 and 112 from being set. Setting of flip-flops 111 and 113 occurs whenever the microcomputer fails to send a signal to one-shots 113 and 114 within a predetermined time period. This occurs either when the microcomputer detects any one of a number of failure indicating conditions, or when the microcomputer itself fails to properly execute its operating program.

Microcomputer 90 communicates with the remaining circuitry primarily via three eight-bit data buses 120, 125, and 130, designated DB, P1, and P2 respectively. Individual lines on buses 120, 125, and 130 are designated DB0–DB7, P10–P17, and P20–P27, respectively. Buses 120 and 125 communicate with external peripheral I/O devices, designated generally by reference numeral 131. I/O devices 131 communicate signals which cause microcomputer 90 to carry out the same tasks as it would in response to corresponding switch manipulations. Within meter 5, certain of these data lines serve dual functions. In particular, bus 125 communicates with BAMS 100 and 102 for supplying an address, and with displays 15 and 17 through a buffer 128 on an eight-bit line 129 for supplying a digit code. Also, lines 132 and 133 of bus 130 serve the dual function of selecting which of BAMS 100 or 102 is to be accessed and of selecting which of I/O expanders 92 and 93 is to be accessed via four-bit line 134 of bus 130. Additionally, a four-bit line 135 from I/O expander 92 communicates with the BAMs for supplying data and further communicates with multiplexer 97 for selecting a particular bit from one of motor position indicators 75–78.

Having discussed the general structure of the meter electronic circuitry, the general operation of meter 5 under the control of microcomputer 90 may be described. Broadly, microcomputer 90 executes instructions according to an operating system which includes an initialization routine, a foreground routine, a power loss interrupt routine, background dispatcher loop, and a plurality of background tasks, including subroutines. The background dispatcher loop is, in effect, the main program, and will sometimes be referred to as such. FIG. 4 is a flow chart illustrating the relationship between the initialization routine, the background dispatcher loop, and the background tasks.

Given the conflicts on buses 120 and 130 it is necessary that data or addresses on these lines that could affect access to the BAMs not be disturbed by an attempt to use one of the lines for its alternate function. Thus, the operating system of microcomputer 90 maintains a sharp division between those portions of the program that access the BAMs (designated background) and those portions of the program according to which microcomputer 90 communicates with the switches, displays, and the like (designated foreground).

The background dispatcher loop and the various background tasks are responsible for the normal meter functions including print supervision and accounting, and rely on information supplied by the foreground routine. The foreground routine is executed in response to a periodic timer interrupt generated by a timer inside microcomputer 90 and has the basic functions of energizing the displays, reading the switches and base synchronization signals, and sending signals to one-shots 113 and 114 to prevent fault flip-flops 111 and 112 from faulting the meter. The state of the various switches ascertained by the foreground routine is stored in switch registers within the working memory of microcomputer 90, so as to provide information to other parts of the operating system. The basic constraints on the timer interval are imposed by the requirements that the display digits be energized a particular number of times per second and that the keyboard switches be read more often than the minimum duration of a switch closure. As will be seen below, the rate at which the one-shots must be triggered is an easily varied parameter.

Upon receipt of a signal from power surveillance circuitry 105, an interrupt is generated, and the power loss interrupt routine is entered. This routine blanks displays 15 and 17, deenergizes stepping motors 45, 46, 47, and 48, and sets solenoid 85 to the print disabling position. The routine also sets a bit in memory, in analogy to the switch registers to communicate to the background that a power loss interrupt has occurred.

Turning to the background, with reference to FIG. 4, after execution of the initialization routine (block 150), microcomputer 90 sets a bit in its memory to signify that no BAM accesses are in progress, this state being designated "enable foreground" (block 152), and enters the background dispatcher loop indicated generally within dashed rectangle 154. Within this loop, microcomputer 90 sequentially checks the status of the power loss bit and various so-called WAKEUP bits that will have been set by the foreground routine, and jumps to an appropriate background task as required. The first check is whether the power loss bit has been set (block 158). If it has, microcomputer 90 executes a wait loop 160 until the system reset circuitry generates an MPCLR signal to cause microcomputer 90 to cease execution. Assuming no power loss, microcomputer 90 sequentially checks the WAKEUP bits to determine whether a register display is required (logical branch 162), whether the meter is in a print cycle (logical branch 164), whether an I/O request has been made (logical branch 166), whether the keyboard register has changed indicating a new keyboard entry (logical branch 168), and whether a print task is to be performed (logical branch 170), before returning to the beginning of the background dispatcher loop. During a print cycle, I/O requests and new keyboard entries are ignored, as indicated by branch 171.

Assuming that a register is to be displayed, that an I/O request is present, that a new keyboard entry has been made, or that a print task is to be performed, the program jumps to the appropriate background task indicated by blocks 172, 176, 178, and 180 respectively. The particular features of the background task routines will be described in detail below. Since execution of each of these background tasks involves access to the BAMs at some point, the foreground is immediately disabled so that data on the lines to the BAMs will not be overwritten during the execution of the foreground routine which occurs in response to a timer signal not under the control of the background dispatcher loop. After completion of the appropriate tasks, each of the background routines returns to the background wait loop after enabling the foreground (block 152). Under certain circumstances, the print task routine does not return directly to the main background loop, but first jumps to a portion of the keyboard task return before returning (blocks 182 and 183).

A detailed description of the foreground routine is deferred until after the structure of the meter electronic circuitry has been set forth in greater detail. Nevertheless, the following general description is set forth in order to make clear the overall operation of the meter operating system. The foreground routine does not accomplish all its tasks on a single entry. Rather, a total of 27 timer interrupts are required for a complete cycle. Thus a 400 microsecond timer interval results in a cycle time of about 11 milliseconds, which correlates with the need for the digits of display 17 to be energized approximately 80 times per second. Also, the 11 millisecond interval is considerably shorter than the 50 millisecond minimum duration of a pulse resulting from the depression of a keyboard key.

The digits on display 15, requiring greater brightness than those on display 17 must be energized more often. In particular, display 15 is energized four times for every time that on display 17 is energized. As will be discussed in greater detail with reference to FIGS. 12a and 12b, sending a signal to energize a particular digit on display 15 or 17 allows a particular position of register display selector switch 25 or a particular keyboard switch 38 to be read. The state of the remaining switches must be separately determined. Since switch noise having a duration of approximately 2 milliseconds is inevitably present during the initial actuation of a switch, the foreground routine debounces the switches and does not consider a switch state to have changed unless it remains changed on two successive readings (i.e., for more than 11 milliseconds).

Upon entering the foreground routine in response to an interrupt from the 400 microsecond timer, microcomputer 90 checks the foreground bit to determine whether the foreground is enabled or whether a background task was in progress. If the foreground is enabled, the routine does the appropriate display energization and/or switch state read according to a sequence to be described below. Assuming the foreground is enabled, the routine then checks whether the interrupt is a particular one in the sequence that requires a signal to be sent to the fault one-shots and only triggers the one-shots at that particular point in the sequence. If the foreground was not enabled, the routine triggers the fault one-shots regardless of the interrupt's position in the sequence control and then passes to the background routine.

The discussion immediately following is with reference to FIGS. 5-13 which are circuit schematics illustrating in greater detail the electronic meter system set forth in the block diagram of FIG. 3. Accordingly, in the discussion that follows, reference should, at appropriate times, also be made to FIG. 3. The circuit elements are, wherever practical, solid state integrated circuit components. Suitable components are set forth in the following table:

| Function | Type | Manufacturer |
|---|---|---|
| Microcomputer | 8049 | Intel |
| BAM | P5101L-1 | Intel |
| I/O Expander | P8243 | Intel |

| Function | Type | Manufacturer |
| --- | --- | --- |
| Comparator | LM2903P | National Semiconductor |
| Buffer | ULN2003AN | Texas Instruments |
| One-shot | MC14538BP | Motorola |
| Nand gate | MC14011P | Motorola |
| Nor gate | MC14001 | Motorola |
| OR gate | MC14071 | Motorola |
| Multiplexer | 74C150 | National Semiconductor |
| Demultiplexer | 74145 | Texas Instruments |

It should be noted that the preferred type of microcomputer (Intel microcontroller 8049) includes 2048 bytes of read only memory (hereinafter designated ROM) which is programmed with the desired operating program by the manufacturer. During the period that the invention was undergoing development, a type 8035 microcontroller having no ROM of its own was used in connection with an Intel 8755A memory chip which provides 2048 bytes of UV programmable ROM, to facilitate changes to the operating program.

FIGS. 5 and 6 are circuit diagrams illustrating external power levels and signals that are communicated from the base to the postage meter. Communication is preferably established by a multiple conductor cable having suitable connectors at its ends to mate with corresponding sockets on the base and on the meter.

Turning first to FIG. 5, various power levels are shown. An external source of at least +9.6 volts, designated VLOGIC is coupled to a line 200 in meter 5. The voltage on line 200 charges a large (e.g. 10,000 microfarad) capacitor 201. Line 200 communicates to an input of a 5-volt regulator 202 to produce a regulated +5 volt power level, designated VCC, on a line 205. VCC is used for powering various integrated circuit components within meter 5 that require a regulated +5 volt source.

BAMs 100 and 102 are powered by separate voltage sources, designated VBAM1 and VBAM2. These voltages are produced on respective lines 210 and 212, within meter 5. A related +5 volt level, designated VBAM0, is generated on a line 215. A first pair of 2.8 volt batteries 220 is coupled to line 210 via three diodes 225 in series. Similarly, a second pair of 2.8 volt batteries 230 is coupled to line 212 through three diodes 235 series. VLOGIC is coupled to a line 240 within meter 5, and is regulated to +5.7 volt by a 5 volt regulator 242 and a diode 245 to ground. The regulated output voltage appears at a circuit point 250 and is communicated to line 215 through a diode 251. Circuit point 250 is coupled to line 210 through a diode 252 and to line 212 through a diode 255.

Two levels, designated VEXT1 and VEXT2, are communicated to respective lines 258 and 260 within meter 5. However, these lines are not powered when the meter is on a base, but rather are powered independently and mutually exclusively of VLOGIC when the BAM contents are to be read independent of microcomputer 90. VEXT1 also communicates to lines 210 and 215 through respective diodes 262 and 263. Similarly, VEXT2 communicates to lines 212 and 215 through respective diodes 265 and 266.

Since the voltage from regulator 242 exceeds the voltage of batteries 220 and 230, when VLOGIC is supplied to line 240, the regulated output of regulator 242 supplies power on lines 210 and 212. This produces a level of +5 volt on lines 210 and 212, there being a voltage drop of approximately 0.7 volts across each of diodes 252 and 255. When there is no power from regulator 242, batteries 220 and 230 provide power to lines 210 and 212, respectively. Batteries 220 and 230 are preferably lithium primary cells having a shelf life typically in excess of ten years. Suitable batteries are manufactured by Mallory.

Two additional external power sources in the base are coupled to meter 5. A source of +34 volt, designated VMOTOR, is coupled to a line 270 within meter 5 to supply power to stepping motors 45, 46, 47, and 48. A source of +5 volt, designated VDISP, is coupled to a line 275 within meter 5 to supply power for the digits of displays 15 and 17.

In addition to supplying power to meter 5, the base performs paper handling functions, and communicates signals to meter 5 in order to synchronize the activity within meter 5 with the paper handling that is ongoing. These signals are illustrated schematically in FIG. 6. A grounded connection in the base is communicated to a line 280 within the base to supply a signal designated $\overline{MB}$, which is low whenever the meter is mounted to a base. A signal, designated $\overline{TAPE}$ is communicated to a line 282 within meter 5, a low level signifying to the meter that a postal tape is to be printed. A signal, designated $\overline{ENVELOPE}$ is communicated to a line 285 within meter 5, a low level signifying that an envelope is to be printed. A signal, designated $\overline{REPEAT}$, is communicated to a line 287 within meter 5, a low level signifying that multiple tapes are to be printed with the same value. A signal, designated $\overline{CLUTCH}$, is communicated to a line 290 within meter 5, a low level signifying the fact that a clutch within the motor in the base that provides mechanical power to the print head within the meter has been pulled. An external interrupt signal, designated $\overline{EXTINT}$, is communicated to a line 292 in meter 5 indicating the need to service an I/O request.

From a functional point of view, the signals on lines 280, 282, 285, 287, 290, and 292 are treated like switches, the status of which is periodically determined by microcomputer 90 during execution of the foreground routine in order to properly allocate task flow.

FIG. 7 illustrates the generation of certain signals within meter 5. A signal, designated $\overline{POMODE}$, is produced on a line 295 to reflect the status of mode changing switch 30. Mode changing switch 30 is magnetically coupled to a Hall Effect sensor 297 within meter 5. The normal state communicates a high level to line 297, indicating that the meter is in the "mail room mode". When switch 30 is placed in the "post office mode" position, sensor 297 communicates a low level to line 295.

The position of the print head is detected by a Hall Effect sensor 300 which cooperates with an iron element 301 on the printhead shaft. A signal, designated $\overline{LEFT\ HOME}$, is produced on a line 302, the level on line 302 being high when the print head is in its home position and low when the print head is away from its home position.

FIG. 8 includes a circuit schematic of power surveillance circuitry 105. Power surveillance circuitry 105 has the function of producing a signal, designated PWRLSS, on a line 330, whose level is high whenever VLOGIC is below about 9.5 volts. Line 330 is coupled to an output 335 of a voltage comparator 340. Comparator 340 is supplied at a first input 341 with VCC, and at a second input 342 with a precisely maintained fraction of VLOGIC. The fraction is defined by a voltage divider including a 5.9 K, 1% resistor 345 and a 10 K, 1% resistor 347. So long as VLOGIC remains above approximately 9.5 volts, the voltage at input 342 remains above 5 volts. VCC, being a regulated output voltage based on VLOGIC, remains at 5 volts so long as VLOGIC remains above approximately 7 volts. When VLOGIC falls below 9.5 volts, the voltage at input 342 falls below the voltage at input 341. Comparator 340 then causes a high level to appear at output 335 which is coupled to line 330. This PWRLSS signal is communicated to microcomputer 90 on line 330 to initiate a power loss interrupt.

The relative sequence of these events is best understood with reference to FIG. 10 which is a timing diagram illustrating a complete power up and power down cycle. As VLOGIC increases from 0 to 7 volts, VCC increases correspondingly from 0 to 5 volts. As VLOGIC increases from 7 volts to about 9.5 volts or above, VCC maintains its regulated 5 volt output. During the increase of VLOGIC from 0 to 9.5 volts, PWRLSS, which depends on VLOGIC which powers comparator 340, rises to assume a high level. Once VLOGIC has increased above 9.5 volts, PWRLSS assumes a low level, the transition being designated 355. Similarly, as VLOGIC falls below 9.5 volts, PWRLSS assumes a high level, the transition being designated 358. PWRLSS remains high as VLOGIC decreases from 9.5 to 7 volts, and thereafter generally follows VLOGIC as it decreases towards 0. VCC remains at 5 volts so long as VLOGIC is above 7 volts.

Transitions 355 and 358 in the PWRLSS signal are significant events that initiate a particular sequential generation of MPCLR and SYSCLR signals. This insures that operation of the electronic control system, including microcomputer 90, only occurs during periods, when the available power is sufficient to ensure reliable operation of the components. Moreover, the sequence is designed to provide sufficient time to complete any updating of BAM registers before inhibiting microcomputer operations in order to maintain data integrity.

Broadly, SYSCLR, when high, inhibits operation of the print mechanism and writing data to BAMs 100 and 102. MPCLR, when high, inhibits operation of microcomputer 90. Accordingly, MPCLR must go low before SYSCLR goes low and remain low until after SYSCLR goes high in order to ensure that microcomputer 90 maintains control at all times that printing could occur or data could be written to the BAMs.

Referring to FIG. 10, the requirements on the timing of MPCLR and SYSCLR can be seen. Once PWRLSS has gone low, MPCLR must remain high for a duration 360 to ensure that microcomputer 90 has had power for a sufficient time to operate reliably. MPCLR then goes low, indicated schematically as transition 362. Microcomputer 90 then commences operation and SYSCLR, which has been high, then goes low, to allow normal meter functioning. This transition, indicated 365, must occur later than transition 362 by an interval 370. Similarly, when PWRLSS goes high, SYSCLR must remain low for a sufficiently long time to complete any writing to the BAMs that is in progress. A duration 372 must elapse before SYSCLR goes high, the transition being designated 375. After SYSCLR has gone high, MPCLR goes high, the transition being designated 377 occurring after transition 375 by an interval 380. The length of intervals 370 and 380 is of no particular significance, so long as the particular ordering is maintained. Intervals 360 and 372 are functions of the particular hardware configuration and components used. For the embodiment described herein, interval 360 is preferably greater than 50 milliseconds while interval 372 is greater than 20 milliseconds. During interval 372 it is necessary that VCC remain at its 5 volt level to insure that the electronic components function reliably and that an enable on the BAMs (to be disscussed below) remain above 2.2 volts. This means that VLOGIC cannot be allowed to fall below 8 volts in less than 20 milliseconds. This reserve capacity is provided by capacitor 201 (FIG. 5) which insures that enough power will be available to maintain reliable operation during interval 372.

FIG. 8 also includes a circuit schematic of system reset circuitry 110, which has the function of generating MPCLR and SYSCLR signals according to the above sequence in response to transitions 355 and 358 of the PWRLSS signal. System reset circuitry 110 actually provides complementary SYSCLR and MPCLR signals, designated $\overline{SYSCLR}$ and $\overline{MPCLR}$, on respective line 390 and 392.

Circuitry 110 includes a comparator 400 having a first (positive) input 401 maintained at a fixed fraction of VCC by a voltage divider chain comprising 5.9K resistor 402 and a 10K resistor 404. A second (negative) input 406 is coupled to a capacitor 407 to ground and to a resistor 408 to VCC. The PWRLSS signal on line 330 communicates to comparator input 406 through a diode 409. An output 410 of comparator 400 communicates a circuit point 415.

Circuit point 415 is coupled through a resistor 417 to a circuit point 422 which communicates to different portions of the circuitry. First, circuit point 422 is coupled through a diode 425 to the base of a Darlington transistor 428, the emitter of which drives line 390 ($\overline{SYSCLR}$). The base of transistor 428 is coupled to a capacitor 430 to ground, and to VCC through a resistor 432, and further to the collector of a transistor 435. Second, circuit point 422 is coupled through a diode 440 to an intermediate circuit point 442 of a chain defined by a 75K resistor 445 to VCC, and a 4.7 microfarad capacitor 450 to ground. Capacitor 450 is coupled to the base of a Darlington transistor 455. The collector of transistor 455 is coupled through a diode 457 to a circuit point 458. Circuit point 458 is coupled through a resistor 460 to the base of transistor 435, and through a resistor 465 to the base of a transistor 470, the collector of which is coupled to line 392 ($\overline{MPCLR}$).

Consider first a condition wherein a high level has persisted for a substantial length of time on line 330. Capacitor 407 is fully charged to VCC, and output 410 of comparator 400 is low. Accordingly, circuit point 415 is low, so that circuit point 422 is low. This causes the base of transistor 428 to be low, thereby causing transistor 428 to be in a nonconducting state so that the level on line 390 is low. That is, SYSCLR is high. The low level on emitter 422 maintains circuit point 442 at a low level, thereby keeping transistor 455 in a nonconducting state. Accordingly, circuit point 458 is high so that transistor 435 assumes a conducting state. The collector of transistor 435 is thus at a low level, thereby reinforcing the low level imposed through diode 425 across capacitor 430. Also, the high level at circuit point 458 turns transistor 470 on, and causes a low level to appear on line 392 (MPCLR is true).

When PWRLSS goes low (transition 355), the following events occur in order to cause MPCLR and SYSCLR to go low in the required sequence producing intervals 360 and 370. When the level on line 330 goes low, diode 409 conducts, thereby discharging capacitor 407 and causing the input 406 of comparator 400 to go low. Output 410 goes high, causing circuit point 415 to go high. A high level thus appears at circuit point 422. This blocks diode 440, thereby causing capacitor 450 to become charged through resistor 445. Resistor 445 is relatively large (75K) thereby resulting in a substantial delay before the voltage across capacitor 450 is enough to switch transistor 455 to its conducting state. This delay substantially defines interval 360, since once transistor 455 is conducting, circuit point 458 goes low, thereby turning off transistor 470 and causing a high level to appear on line 392. That is, MPCLR goes low. Once the delayed low level has appeared at circuit point 458, transistor 435 is turned off, thereby allowing capacitor 430 to become charged through resistor 432. This causes transistor 428 to become conducting after a time interval defined by capacitor 430 and resistor 432, at which point, the level on line 390 goes high. That is, SYSCLR goes low.

When PWRLSS has been low for some time so that the various components of power surveillance circuitry 110 are in the states described above, and then PWRLSS goes high (transition 358), the following sequence of events occurs. The high level on line 330 blocks diode 407, causing capacitor 408 to become charged through resistor 409. After a delay in excess of 20 milliseconds, the voltage on capacitor 408 exceeds the fractional level defined by resistors 402 and 404, and output 410 of comparator 400 goes low. This delay establishes interval 372. A low at output 410 causes a low at circuit points 415 and 422. This causes the base of transistor 428 to go low, thereby turning off transistor 428 causing a low to appear on line 390. That is, SYSCLR goes high.

When circuit point 422 goes low, diode 440 which was formerly blocked becomes conductive, causing capacitor 450 to discharge through resistor 447. After a delay determined by the time constant of capacitor 450 and resistor 417, transistor 455 is turned off thereby causing its collector to go high and conduction to occur through diode 457. This causes transistor 435 to conduct, thereby reinforcing the low at the base of transistor 428. In addition, the high level at circuit point 458 causes transistor 470 to conduct, thereby causing a low level to appear on line 392. That is, MPCLR goes high.

FIG. 9 is a circuit schematic of circuitry for generating signals to inhibit meter functioning upon detection of a fault condition. Two redundant circuits are employed, and with an exception to be discussed below, these two circuits are equivalent. Thus only one will be discussed herein.

One-shot 113 has an input 500 which is responsive to a falling edge. A resistor 506 and a capacitor 504 are coupled to one-shot 113 to establish basic timing. One-shot 113 has a reset input 507 to which the MPCLR signal on line 392 is coupled by a line 508. One-shot 113 has a complementary output 509 which is coupled to a first input of a NAND gate 510. NAND gate 510 has a second input to which is coupled the SYSCLR signal on line 390 by a line 511. NAND gate 510 has an output 512 which is coupled to flip-flop 111. Flip-flop 111 has an output 515 which is coupled through a diode 517 to the base of a Darlington transistor 520, the collector of which is coupled to line 390 of system reset circuitry 110 by line 511. Under normal conditions, microcomputer 90 periodically causes the generation of a signal, designated MPTS1, to fire one-shots 113 and 114. As will be discussed below, the signal from microcomputer 90 causes a low level to appear at input 500. A low level is generated on complementary output 509 in response to a negative going level at input 500, and remains low for a duration defined by capacitor 504 and resistor 506. In the preferred embodiment this duration is 20 milliseconds. Since one-shot 113 is a retriggerable one-shot, a subsequent signal at input 500 extends the period that output 509 remains low. Thus, repeated signals at less than 20 millisecond intervals maintain output 509 low. So long as the level on output line 509 is low, the level on line 512 is high. Fault flip-flop 111 maintains a low level on output line 515 so long as the level on line 512 is high. If, for some reason, the level on line 512 goes low, a high level appears on flip-flop output 515, and remains, even if the level on line 512 goes high again. A high on line 515 blocks diode 517 and causes a high level to appear at the base of transistor 520. This causes a low level to appear on line 511, which low level causes the level on line 390 (SYSCLR) to remain low regardless of the level of PWRLSS. Accordingly, once fault flip-flop 111 has been set to have a high level at its output 515, a low level is maintained on line 390. That is, once fault flip-flop 111 is set, SYSCLR remains high regardless of power up and power down cycling. By coupling MPCLR to one-shot reset input 507, the level on one-shot output 509 is caused to remain high after MPCLR is false until signals from microcomputer 90 appear at input 500. Also, by coupling SYSCLR to NAND gate 510, a high level is maintained on line 512 when SYSCLR is true. Thus, fault flip-flop 111 is prevented from being set to its "faulted state" during the times that SYSCLR is true during normal power cycling.

Fault flip-flop 112 and retriggerable one-shot 114 are coupled in a similar way with the exception that one-shot 114 uses the non-complementary output on a line 540. The output on line 540 is coupled to both inputs of a NAND gate 542 which is physically removed from the integrated circuit chip including one-shots 113 and 114. Accordingly, if the chip on which one-shots 113 and 114 are located failed in a way that would cause all outputs to assume a high or low level, one of the fault flip-flops would be set. Only a dual failure which would cause the output on line 509 to remain low and the output on line 540 to remain high would go undetected. This is in keeping with the general meter design which can tolerate one failure and maintain integrity, but cannot accommodate certain combinations of compensating failures.

The level on line 390 is communicated to a circuit point 549 through cascaded Darlington buffers 545 and 547. Circuit point 549 is coupled to the cathode of fault indicator light 20, preferably a light emitting diode, the anode of which is coupled to VCC. Thus when circuit point 549 goes low light 20 is illuminated. Thus, light 20 is briefly illuminated during power up and power down cycling for those periods that circuit point 549 is low, providing the operator with an indication that the light works. Once SYSCLR has gone high, light 20 is illuminated. This occurs when a fault condition has occurred, regardless of power cycling.

FIGS. 11a, 11b, and 11c, taken together, are a circuit schematic of microcomputer 90, BAMs 100 and 102, and circuitry for generating and responding to control signals related to accessing the BAMs.

Of the various control signals discussed above, microcomputer 90 reacts directly to PWRLSS and $\overline{\text{MPCLR}}$. A high level on line 330, signifying a low power condition is inverted by a NOR gate 560 and communicated to an interrupt input 562 of microcomputer 90. A low level appearing at interrupt input 560 causes a power loss interrupt as discussed in connection with FIG. 8. The signal $\overline{\text{MPCLR}}$ on line 392 is communicated to a reset input on microcomputer 90. A low level on line 392 (MPCLR true) causes microcomputer 90 to be disabled and to cease execution.

Microcomputer 90 also generates control signals for selecting which of BAMs 100 and 102 is to be accessed, and which of I/O expanders 92 and 93 is to be accessed. These two selection procedures make use of the same data lines 132 and 133 (lines P24 and P25 of bus 130). The significance of the signals on lines 132 and 133 depends on whether microcomputer 90 is executing a background routine (BAM select) or the foreground routine (I/O expander select).

Microcomputer 90 selects one of I/O expanders 92 and 93 by causing the generation of signals designated PROG1 and PROG2 on respective lines 565 and 567. The level on output lines 132 and 133 is communicated to respective OR gates 570 and 571, the other input of each of which is connected to an output line 572 of microcomputer 90. The level on line 572 is normally high, but goes low at the same time that a control code for an I/O expander appears on line 134. The level on line 572 then goes high and at the same time data to be transferred appears on line 134. Thus the signal on line 572 appears on line 565 or 567, depending on whether line 132 or 133 is low.

Reading and writing to BAMs 100 and 102 are controlled by providing appropriate levels at four control inputs of each BAM. Each BAM includes two chip enable inputs 573 and 574, designated CE1 and CE2, respectively. The level at chip enable input 573 must be low to enable access to the BAM contents, while the level at chip enable input 574 must be high. A low level at chip enable input 574 causes the BAM to assume a so called "low power mode" in which it draws only the small amount of power required to maintain its contents. In the low power mode, access to the BAMs in inhibited. Each BAM includes an output disable input 575, designated OD, which must be at a low level in order to read the BAM. Each BAM includes a write enable input 576, designated $R/\overline{W}$, the level at which must be low for writing to occur, and high to disable writing during a read operation.

Microcomputer 90 selects which of BAMs 100 and 102 is to be read by causing a low level to appear on either of lines 132 and 133, which low level is communicated to respective chip enable inputs 573. Microcomputer 90 controls reading and writing to the BAMs according to the output level on a line 579 (line P27 of data bus 130). Line 579 communicates to a first input of a NAND gate 580, and the signal $\overline{\text{SYSCLR}}$ on the line 390 is communicated to a second input of NAND gate 580, so that the output of NAND gate 580 is low only when $\overline{\text{SYSCLR}}$ is high and the output on line 579 is high. The signal at the output of NAND gate 580 is communicated on a control line 585 to control inputs 576 on BAMs 100 and 102 to control writing to both BAMs.

The levels VLOGIC, VEXT1, and VEXT2 control reading and writing to the BAMs independent to microcomputer 90. VLOGIC communicates to respective chip enable inputs 574 on BAMs 100 and 102 through a common back biased 5.1 volt zener diode 590 and respective diodes 592 and 595. VEXT1 and VEXT2 also communicate to the respective inputs 574 through respective diodes 597 and 600. Thus when VLOGIC rises above about 5.7 volts, zener diode 590 breaks down and diodes 592 and 595 conduct. Thus the level at inputs 574 begins to rise and when it reaches about 1.5 volts, puts BAMs 100 and 102 into their so-called "high power mode" in which reading and writing may occur so long as other control signals are present. In the absence of VLOGIC, powering VEXT1 or VEXT2 allows the BAMs to be accessed. In the absence of sufficiently high levels of VLOGIC, VEXT1, and VEXT2, chip enable inputs are held low by pull-down resistors to ground.

Writing to the BAMs can occur independent of microcomputer control 90 for the purpose of allowing a postal service employee to zero certain locations when the meter has faulted. To permit this to occur, the signal $\overline{\text{POMODE}}$ on line 295 and a signal $\overline{\text{TWRITE}}$ on a line 609 are communicated to first and second inputs of a NOR gate 610. The output of NOR gate 610 is communicated to the base of a transistor 615, the collector of which is coupled to BAM control line 585. Therefore, a low level on lines 295 and 609 causes a high level at the output of NOR gate 610, thereby turning transistor 615 on and causing a low level to appear on line 585, thereby allowing access to the BAMs.

In addition to controlling reading and writing to the BAMs, the $\overline{\text{SYSCLR}}$ signal on line 390 cooperates with signals from microcomputer 90 in order to generate a signal designated SON on a line 620 for controlling print head solenoid 85. Signals on an output line 622 (line P26 of bus 130) are communicated to a first input of a NOR gate 625. The signal on line 390 ($\overline{\text{SYSCLR}}$) is first inverted by a NOR gate 628, to produce a SYSCLR signal and communicated to a second input of NOR gate 625, the output of which is coupled to line 620. Therefore, a high level on line 390 and a low level on output line 622 are required for SON to be high. Otherwise, SON is low. As will be discussed below, SON must be high to allow the print head to rotate. The SYSCLR signal from NOR gate 628 is communicated to motor interface circuitry on a line 629.

FIG. 12a is a circuit schematic of circuitry for interfacing microcomputer 90 to the switches, displays, BAMs, and motor position sensors. Data flow is established through I/O expander 92. I/O expander 92 receives signals on four bit data line 134 (lines P20-P23 of data bus 130), in order to determine which of four data ports 650, 652, 654, and 656 is to be accessed, whether a read or a write operation is to be carried out, and whether the data is to be logically manipulated. Once this selection has occurred, data is communicated to or from microcompuer 90 on the same line 134. In the preferred embodiment, I/O expander 92 is used for generating address codes at its I/O ports in order to control demultiplexers 94 and 95 and multiplexers 96 and 97. Data port 650 is coupled to an address input 660 of multiplexer 96. Multiplexer 96 has 16 data inputs, not all of which are used. The following signals, the generation and significance of which were discussed in connection with FIGS. 6 and 7 are communicated to respective inputs of multiplexer 96: $\overline{\text{POMODE}}$ on line 295; $\overline{\text{LEFT HOME}}$ on line 302; $\overline{\text{MB}}$ on line 280; $\overline{\text{TAPE}}$ on line 282; $\overline{\text{ENVELOPE}}$ on line 285; $\overline{\text{REPEAT}}$ on line 287; $\overline{\text{CLUTCH}}$ on line 290, and $\overline{\text{EXTINT}}$ on line 292. Selector switch 27 is coupled to two inputs on multiplexer 96 in order to communicate a low level to that input corresponding to the position of switch 27.

In addition to the above signals, signals designated $\overline{KIN}$ and $\overline{RIN}$ on respective lines 670 and 675 are communicated to respective data inputs of multiplexer 96. $\overline{KIN}$ and $\overline{RIN}$ are time multiplexed signals reflecting the state of selector switch 25 and keyboard 12. These will be discussed below.

Data port 652 is coupled via four-bit line 135 to an address input of multiplexer 97 and on a parallel line to BAMs 100 and 102. Data ports 654 and 656 commmunicate with demultiplexers 94 and 95 on respective data lines 680 and 685 for refreshing displays 15 and 17, and reading selector 25 and keyboard 12, as will be discussed presently. These operations cause the generation of $\overline{KIN}$ and $\overline{RIN}$ on lines 670 and 675.

FIG. 12a is a circuit schematic illustrating circuitry for periodically energizing the digits of displays 15 and 17, and reading keyboard switches 38, 40, and 42, and selector switch 25. Each digit of nine-digit display 17 comprises eight light emitting diode segments including seven bars for representing numeric symbols, and a decimal point. Display 17 includes a digit select input for each digit (nine in all), and eight segment select inputs 698. Display 17 is a common cathode device, which means that a given digit select input 695 is coupled to the cathodes of all eight segments for that digit, while a given segment select input is coupled to the anodes of a particular segment for all nine digits. Thus, a low level at a particular digit select input 695 causes that digit to be illuminated according to which of segment select inputs 698 is at a high level.

Demultiplexer 94 includes ten data outputs 700, and a four-bit select input 702, such that a low level appears at the output 700 corresponding to the binary code defined by the levels at select input 702. Nine of outputs 700 are connected in a one-to-one fashion to digit select inputs 695 on nine-digit display 17. Each of the ten demultiplexer outputs 700 is coupled to one pole of a numeric keyboard switch 38, the other pole of which is coupled to line 675 $\overline{RIN}$. Buffered data on line 129 is communicated through current limiting resistors 705 to a corresponding eight-bit line 707. Each individual conductor is coupled to one of segment select inputs 698 with one of the conductors, designated 708, coupled to the segment selector controlling the decimal points. Thus, according to the binary code on four bit line 680, one of multiplexer outputs 700 is set to a low level, which causes a low level to appear on line 675 if the corresponding keyboard key 38 was closed. Additionally, in the case of those nine of outputs 700 which are coupled to display digit select inputs 695, a low level causes that display digit to be illuminated according to the levels on line 129. Thus, each time one of the digits is energized, a corresponding signal indicates the status of a particular keyboard key. After the nine digits have been energized, the tenth demultiplexer output is selected, providing a level on line 695 that indicates the status of the tenth numeric keyboard key 38.

Four-digit display 15 comprises first and second two-digit displays 720 and 722, each digit of each display having eight light emitting diode segments including seven bars and a decimal point. Each digit includes a digit select input 730 and eight segment select inputs. For the particular display components in the preferred embodiment, each digit is independent, thereby requiring individual segment selection. Data on eight-bit line 707 is communicated to the segment selector inputs.

Digit displays 720 and 722 are common anode devices, so that when the level at one of digit selector inputs 730 is high, that particular digit is illuminated according to which of the individual lines of line 707 is at a low level. Conductor 708 of eight-bit line 707 is coupled to the decimal point segment selectors for display 720, but two-digit display 722, corresponding to the least significant digits, has no connection to line 708. Rather line 708 is coupled to the cathode of indicator light 22, preferably a light emitting diode, the anode of which is coupled to that digit selector input 730 corresponding to the least significant digit of display 15.

Demultiplexer 95 has a four-bit select input 750, and ten data outputs, nine of which, designated 751-759, are connected as follows. Data outputs 751 and 752 are coupled to respective first poles of keyboard switches 40, and 42, respective second poles of which are coupled to line 675. Output 758 is coupled to a line 765 to provide a signal, designated $\overline{EIO}$ for controlling I/O peripheral devices 131. Output 759 is coupled to a line 767 to generate the signal $\overline{MPTS1}$ which is communicated to input 500 of fault one-shots 113 and 114.

Each of data outputs 753-757 is coupled to a contact of five position display selector switch 25, the common wiper of which is coupled to line 670. Of the five data outputs 753-757, four of them, 753-756, are coupled in a one-to-one fashion to digit select inputs 730. However, the coupling is not direct as in the case of the circuitry for energizing display 17, since display 15 is a common anode device. Each digit selector input 730 is coupled to the collector of a PNP transistor 765, the emitter of which is held at VDISP. Each of data outputs 753-756 is resistively coupled to the base of a corresponding one of transistors 765.

Accordingly, depending on the binary code defined by the levels on four bit line 685, a particular one of data outputs 751-759 is provided with a low level. When output 751 or output 752 goes low, a low level is applied to line 675 if special keyboard key 40 or 42, respectively, is depressed. If either of outputs 758 or 759 is selected, a signal having a falling edge followed by a low level is generated on line 765 or 767, respectively, communicating to other portions of the circuitry as described above. A low level on any of outputs 753-756 causes the corresponding transistor 765 to become conducting, thereby providing a high level at the particular digit select input 730. Depending on which of the individual lines of line 707 is at a low level, the particular segments of the selected display digit will light. Noting that neither of the least significant digits ever requires a decimal point following, indicator light 22 is connected in a manner that substitutes for the decimal point of the least significant digit whose decimal point cathode is not connected to anything. Thus, when the least significant digit is selected and the level on line 708 is low, "Add $" indicator light 22 is energized. Also, data outputs 753-756, in cooperation with data output 757, provide the signal $\overline{KIN}$ for communicating the status of switch 25 to microcomputer 90.

FIG. 13 is a circuit schematic illustrating the circuitry for interfacing microcomputer 90 to stepping motors 45-48 and position sensors 75-78. While FIG. 13 illustrates the complete interface circuitry, only one stepping motor 47 and corresponding position sensor 77 is shown for clarity. Broadly, the interface circuitry includes I/O expander 93, multiplexer 97, and a plurality of Darlington buffers 780 coupled to VMOTOR to provide buffered outputs that are either low or at a level VMOTOR. I/O expander 93 includes four data ports 785, 786, 787, and 788, signals at which are communicated through Darlington buffers 780 to respective motors 45, 46, 47 and 48, with port 787 communicating with motor 47. I/O expander 93 has an enable input 790 to which SYSCLR is communicated via line 629, and a program input 792 to which PROG1 is communicated on line 133. Control signals and data are communicated in a time multiplexed fashion on four-bit data line 134.

Motor 47 may assume one of ten positions over its angular range that correspond to proper print wheel settings, and eleven positions halfway between. Thus the possible positions can be broken into four groups including a group of so-called "odd" positions, a group of so-called "even" positions, and two groups of so-called "half" positions, each position of which is halfway between an even and an odd position.

Motor 47 includes four windings, corresponding to the four groups of positions. In general, the motor can only be stepped to an adjacent position by energizing the winding corresponding to the group of which the adjacent position is a member. One side of each winding is coupled to VMOTOR in the meter base through a current limiting resistor 789 located in the base. The other side of each winding is coupled to one of the buffered outputs corresponding to the data lines from port 787. A low level on a line at data port 787 turns off the buffered output, thereby resulting in no voltage across the particular winding. Only when a high level appears on an output line at port 787 is a low level communicated to the motor winding, thereby energizing it.

Since energization of a motor winding generally only causes the motor to step to an adjacent position, and since only four types of positions are recognized, absolute position determination may only be established by first driving motor 47 to one of its end points, and thereafter keeping track of all step commands. This is done during execution of the initialization routine.

Position sensor 77 comprises four sets of contacts 791, 792, 793, and 794, each set including ten sequentially spaced contacts, and four grounded wipers 801, 802, 803, and 804, each associated with a respective contact set. Wipers 801-804 are mechanically coupled to the mechanical output of motor 47, so that at a given integral position of motor 47, each of wipers 801-804 makes electrical connection with one of the contacts in its respective contact set 791-794. A binary code representative of the position of wipers 801-804 is generated on four corresponding output lines 811, 812 is 813 and 814, one end of each output line being coupled only to particular individual contacts within its respective contact set. For example, the "1" bit is generated on line 811 by coupling line 811 to every other contact in set 791; the "2" bit by coupling line 812 to every other group of two contacts in contact set 792. The other end of each contact line is coupled to a data input of multiplexer 97. Four-bit data line 135 from port 652 of I/O expander 92 is coupled to an address input 820 of multiplexer 97. According to the binary code represented by the levels on line 135, one of the four bits of information for one of the four position sensors appears at the output of multiplexer 97, and is communicated on line 99 to microcomputer 90.

Print head solenoid 85 prevents movement of the print head away from its home position unless the solenoid is energized. Control is established by the signal SON on line 320. Solenoid 85 includes input terminals 824 and 825. Input terminal 824 is coupled to VMOTOR in the base through current limiting resistors 827 and 828 located in the base. A capacitor 829 is connected across resistor 828 to provide greater initial current. The signal SON is communicated to the base of a Darlington transistor 832, the emitter of which is grounded and the collector of which is coupled to solenoid input terminal 825. Thus, a high level on line 620 causes a low level to appear at input terminal 825 of solenoid 85, thereby energizing the solenoid to permit movement of the print head. A diode 835 is connected across solenoid 85 to protect Darlington transistor 832 from overvoltage when SON goes low.

In view of the above description covering the general operation and detailed construction of meter 5, a description of the detailed operation of microcomputer 90 may be understood. The following discussion and the accompanying figures provide additional detail with respect to the discussion with reference to FIG. 4 outlining the general operation of microcomputer 90.

The operating program for microcomputer 90 is stored in 2,048 bytes of ROM while working memory is provided by 64 bytes of random access memory (hereinafter RAM). FIG. 14 illustrates in tabular form a suitable RAM allocation for storing information required by the operating program of microcomputer 90. For ease and consistency of nomenclature, the individual memory locations will be referenced in first instance with respect to their hexadecimal address within the 64 bytes of RAM, and subsequently by reference to appropriate mnemonics.

Location 0-7 Hex, designated R0-R7 and locations 18-1F Hex, designated R0'-R7' are two sets of directly addressable working registers.

Registers R0-R7 are allocated to the background tasks, to be described more fully below. Register R2 is dedicated to the background status and is hereinafter designated BAKSTA. The individual bits are shown schematically in FIG. 16, and include the power loss bit and the various WAKEUP bits set by the foreground to signify to the background dispatcher loop that a particular task is to be carried out. The particular significance of the various WAKEUP bits will be discussed with reference to the foreground routine and the appropriate background tasks described below. The individual bits in BAKSTA are sequentially checked by the background dispatcher loop as described above with reference to FIG. 4.

Locations 34 Hex and 35 Hex, designated KEYSTA and PRSTA respectively, are used to designate status for the keyboard and printer tasks. Locations 38-3B Hex, designated STEPIN(0)-STEPIN(3) and locations 3C-3F Hex, designated STEPTK(0)-STEPTK(3) provide an additional data base for the print routine. Location 36 Hex, designated PRCTR, is used to store a counter which, when set to a non-zero value, is decremented at each entry into the foreground routine in order to keep track of the time that has elapsed since various print subtasks were initiated. Locations 8-13 Hex provide 12 bytes for a six level stack to allow for six levels of sub-routine calls.

As discussed above, the foreground routine is executed in response to periodic timer interrupts, that occur at 400 microsecond intervals. The main functions of the foreground routine are energizing the digits of four-digit display 15 and nine-digit display 17, ascertaining the status of various switches and signals (collectively referred to as switches), debouncing portions of the switch information, and triggering one-shots 113 and 114. These functions are carried out by selecting I/O expander 92 and setting up appropriate binary codes on four-bit line 134 to communicate with the appropriate switch or display digit via demultiplexer 94, demultiplexer 95, or multiplexer 96.

Registers R0'-R7' are the working registers used by the foreground that enable the foreground routine to carry out its functions according to the desired sequence. For example, four-digit display 15 is sequentially energized four times for every time that nine-digit display 17 is energized in order to provide adequate digit intensity. Register R3' is a counter for keeping track of this sequencing. Register R2' is a pointer that indicates which display digit is currently being done, while R1' is a basic pointer.

Locations 20-28 Hex and 30-33 Hex are used to store the display segment codes for the current values of the digits to be displayed on nine-digit display 15 and four-digit display 17, respectively. The foreground routine sequentially places these segment codes on bus 125 (P1) as the digits are sequentially selected through demultiplexers 94 and 95.

Switch information is stored in four switch registers. Location 1F Hex, designated R7FORG, is dedicated to certain of the base syncronization signals and other signals received through multiplexer 96, the status of which is desired without debouncing. Location 2A Hex, designated REG07, location 2C Hex, designated REG89, and location 2E Hex, designated REGSW, reflect the current debounced state of all the switches that can be set by the operator. The respective bit allocations for switch registers R7FORG, REG07, REG89, and REGSW are shown in FIG. 15. Locations 2B Hex, 2D Hex, and 2F Hex are so-called LAST TIME CHANGE registers corresponding to switch registers REG07, REG89, and REGSW, respectively and carry information indicating which switches corresponding to the bits of the corresponding switch register had changed status on the previous reading by the foreground.

As discussed above, switches are debounced in order to eliminate the effects of switch noise, and the status of a switch to be debounced is considered to have changed only if such change has persisted for two successive readings. Debouncing of the switches is done in two steps. Preliminary debouncing is done on a switch-by-switch basis as each switch is read while final debouncing occurs when all the switches in a given switch register have been read and preliminarily debounced. As discussed above, nine of the ten keyboard switches 38 and four of the five positions of register display selector switch 25 are each read at the same time that a particular display digit is energized. Thus, each one of these switches is read on a separate pass through the foreground routine in conjunction with the energization of a particular display digit. Other switches are read serially in groups during particular single passes through the foreground routine.

Preliminary debouncing occurs as each switch is read. During preliminary debouncing, the switch register for the group of switches being debounced is copied to working register R4', and the corresponding LAST TIME CHANGE register is copied to working register R5'. R0' points to the current one of the switch registers that is being debounced. Preliminary debouncing on the group of eight switches in the particular register stored in R4' occurs over a number of foreground entries. As each switch is read on line 98 from multiplexer 96, the switch state is compared with the corresponding bit in the debounced switch register currently copied into register R4'. A corresponding bit is set in register R6' if the switch state read represents a change from the debounced value in register R4'. When all eight switches in the register being debounced have undergone this preliminary debouncing, R6' contains a record of those switches whose state at the most recent reading has changed with respect to the debounced values. This is stored as the LAST TIME CHANGE register for the next pass of the foreground. Final debouncing occurs by comparing registers R5' and R6'. If, for a particular switch, a change has persisted for two successive readings (corresponding bits in registers R5' and R6' being set) the corresponding bit in the debounced switch register is set to reflect the newly debounced state.

FIG. 17 is a flow chart of the foreground routine illustrating logical branches for executing a preferred sequence for servicing displays 15 and 17, ascertaining the status of the various switches, and performing debouncing. Upon the occurrence of a timer interrupt, microcomputer 90 enters the foreground routine and performs entry tasks generally designated as block 850. These include saving the background accumulator, restarting the 400 microsecond timer, and checking the value of PRCTR (the printer counter). If PRCTR is non-zero, PRCTR is decremented by 1 and the TIMER WAKEUP bit is set if PRCTR has reached zero. The state of bus 130 is saved in register R1', and lines 132 and 133 are set up to select I/O expander 92 for the purpose of reading switches.

The routine then checks whether the foreground is enabled (logical branch 852). If the foreground is disabled, the routine triggers the one-shots by setting the appropriate binary code on demultiplexer 95 in order to select output line 767 (block 855). The routine then restores the background bus 130 and accumulator and returns (block 857).

If the foreground is enabled, the particular display digit is energized according to a preferred sequence. According to the preferred sequence, the digits of nine-digit display 17 are sequentially energized on successive entries to the foreground routine, and then the digits of four-digit display 15 are sequentially energized. The energization of display 15 occurs four times for every time display 17 is energized. In order to maintain this sequence, the foreground routine maintains bookkeeping information in foreground working registers R0'-R3'. This bookkeeping information includes pointers for addressing the particular switch register being debounced, and counters for determining which digit in a given display is to be energized and which of the four passes through the four digits display is being carried out.

If at logical branch 852 the foreground is found to be enabled, the routine checks which display is being serviced (logical branch 860). If the nine-digit display is currently being serviced, the routine checks if either the first or ninth keyboard key is to be read (branch 862). If so, the routine sets up registers R4' and R5' with REG07 or REG89, respectively, and the associated LAST TIME CHANGE register (block 865). Selecting one of the first nine keyboard keys ("0" through "8") to be read occurs in connection with the energization of one of the nine digits of display 17 (block 867). Reading of the tenth keyboard key ("9") is done independently of a digit energization.

During the first eight passes, the numeric keys corresponding to "0" through "7" are being sequentially read, and working register R6' accumulates information relating to changes in these switches for REG07. On the eighth pass (corresponding to keyboard key "7"), final debouncing of REG07 occurs (block 872). A change in REG07 is flagged by setting bit 7 of register R7FORG. The foreground routine then prepares for debouncing switch register REG89 on subsequent foreground passes (block 873), and returns to the background (block 857).

If at logical branch 870 it is ascertained that the eighth keyboard key ("7") is not to be read, a separate test is made to determine whether the tenth key ("9") is to be read (logical branch 875). If the tenth key is not being selected, as would be the case most of the time, i.e. either during preliminary debouncing of REG07 or of the ninth key for REG89, the pointer in working register R2' is incremented (block 877), and microcomputer 90 returns to the background.

If at logical branch 875 it is determined that the tenth key is to be read, that key is read, and the additional switches for REG89 are sequentially read on the same foreground pass and preliminarily debounced (block 880). REG89 is then finally debounced (block 882). The foreground routine then sets bit 7 of REG89 if the meter is not a fractional cents meter or if switch 30 is set to the "post office" mode position or if switch 27 is in the 0.00 position, in order to provide information for the keyboard task (block 885). If a change has occurred to REG89 or REG07 (as remembered by R7FORG(7)), the KEYBOARD WAKEUP is set (block 887). The foreground routine then reads those signals that are to be stored in register R7FORG (block 890). If EXTINT is set, the I/O WAKEUP is set (block 892). In the event that the newly read LEFT HOME or CLUTCH signal is different from the corresponding formerly read signal, the HOME/CLUTCH WAKEUP is set (block 895). The pointers are then set so that the next entry into the foreground routine will cause servicing of four-digit display 15 (block 897).

When it is ascertained at logical branch 860 that four-digit display 15 is to be energized, a test is made as to whether the first position of display selector switch 25 is to be read (logical branch 900). If so, the switch registers are set up to debounce register REGSW (block 865). Selecting one of the first four of the five positions of switch 25 to be read occurs in connection with the energization of one of the four digits of display 15 (block 902). Reading the fifth switch position is not accompanied by selection of any of the four digits on the display. If the fifth position is not being read, the routine branches at logical branch 905 to block 877 and then returns to the background. On the fifth position, the routine tests whether the four-digit display has been energized four times (logical branch 907). If not, register R2' is reset so that the next pass will read the first position (i.e. select first digit) (block 908). The routine then branches to test whether the foreground is enabled (branch 852). The foreground will be found to be enabled (having previously been found so on the same foreground pass), so the first position is read on this pass as the routine branches as described above. If it is ascertained that the display has been energized the required four times, the fifth position is preliminarily debounced and the remaining switches whose bits make up REGSW are read and preliminarily debounced (block 910), and register REGSW is finally debounced (block 912). If REGSW has changed, the TAPE/ENVELOPE WAKEUP is set if the change is to either of the bits corresponding to the TAPE or ENVELOPE signals (block 915). The REGISTER DISPLAY WAKEUP is set if the change is to one of the register select switches (block 920). After performing bookkeeping to prepare for servicing nine-digit display 17 on the next foreground entry (block 922), the routine then fires the one-shots (block 855) and returns to the background.

FIG. 18 is a memory map showing a preferred organization of BAMs 100 and 102, hereinafter sometimes referred to as BAM1 and BAM2, respectively. BAM1 and BAM2 are organized wherein a given hexadecimal address refers to a given hexadecimal digit (4 bits, hereinafter referred to as a nibble).

The key feature in a postage meter, electronic or mechanical, is the maintenance of accounting information to insure that all postage printed is paid for. As discussed above, microcomputer 90 maintains a descending register indicating the amount of postage still remaining (generally designated DR), an ascending register indicating the amount of postage printed (generally designated AR), and a control total which should remain constant between additions of postage at the post office (generally designated TOTAL). In keeping with the fault tolerance aspects of the present invention, these registers, redundant among themselves, are stored in redundant BAMs 100 and 102, the dual copies being designated DR1, AR1, and TOTAL1 for BAM1 and DR2, AR2, and TOTAL2 for BAM2, respectively.

Additional accounting information for use by the user is maintained in dual redundant user resettable registers designated BATCH COUNT and BATCH TOTAL. Each time postage is printed, these registers are respectively incremented by 1 and by the amount of postage printed. Resetting of these registers is effected by pressing "clear batch" key 42 simultaneously with "clear keyboard" key 40. A register designated COUNT is incremented by 1 on each print cycle to provide maintenance information for repair personnel at the factory by indicating the total number of print cycles the meter has undergone. The COUNT register is not accessible to the user.

DR1, AR1, and TOTAL1 are stored at nibbles 00-09 Hex, 10-19 Hex, and 20-29 Hex, respectively in BAM1, with DR2, AR2, and TOTAL2 being stored in corresponding locations in BAM2. BATCH TOTAL 1 & 2, BATCH COUNT 1 & 2, and COUNT 1 & 2 are stored at nibbles 30-39 Hex, 40-49 Hex, and 50-59 Hex, respectively in BAM1 and BAM2. Register display selector switch 25 allows the user to display on nine-digit display 17 one of the registers DR, AR, TOTAL, BATCH TOTAL, and BATCH COUNT. A keyboard register, designated KB, is stored at nibbles 60-69 Hex.

Temporary copies of DR1, AR1, designated TDR1, and TAR1, respectively are stored in nibbles 70-79 Hex and 80-89 Hex, of BAM1. Corresponding copies designated TRD2 and TAR2 are stored in corresponding locations in BAM2. However, as will be described below, only TDR1 and TAR1 are updated during keyboard entry. Nibbles 90-99 Hex in each of the BAMs are used as a temporary register, designated TEMP1 and TEMP2.

Each of the registers described above contains ten nibbles, nine nibbles of which contain the numerical value in BCD representation. The tenth nibble of each register is called the dirty register nibble, bit 3 (most significant bit) of which is set to "1" before a register to register move is carried out into that register. The dirty register nibble is then zeroed at the end of the move.

All the registers except COUNT contain the information to three decimal places. Thus incrementing BATCH COUNT by 1 is carried out by adding 1000 which is thought of as 1.000. COUNT is stored as a whole number and therefore is incremented by adding 1. Nibbles A0-AC Hex of BAM1 are used to store a BCD 1000 which is designated REGTH01 when addressed as nibbles A0-A9 Hex and as REGONE1 when addressed as nibbles A3-AC Hex. Corresponding locations in BAM2 are designated REGONE2 and REGTH02.

If microcomputer 90 discovers a condition requiring that the meter be set to a faulted condition a fault code is first written into nibble 2D Hex of both BAMs so that subsequent examination of the BAM contents can tell the factory what happened. The particular hexadecimal codes for various fault conditions are as follows:

F Hex—An error is detected after writing a nibble to a BAM and reading and verifying the newly written nibble.

7 Hex—An arithmetic error is detected when adding a new character to the keyboard register according to the checked arithmetic algorithms to be described below.

6 Hex—A disagreement between the corresponding permanent registers in BAM1 and BAM2 is detected either before retrieving the register value or after updating the register value.

3 Hex—The print head leaves its home position before positioning of the print wheels is completed, indicating a problem with solenoid 85 or home sensor 300.

2 Hex—The print head does not leave its home position within 100 milliseconds of receiving the debounced clutch signal, indicating a problem with home sensing switch 300.

Nibble 2E Hex of both BAMs is initialized at the factory and is used to designate the maximum number of digits that can be entered into the keyboard register while meter 5 is in the "post office" mode. Nibble 2F Hex of both BAMs is initialized at the factory and describes the type of meter as follows. A "1" in Bit 1 indicates that the meter is a United Parcel Service (UPS) meter which has no lockout when the descending register goes negative. A "1" in Bit 2 indicates that the meter is a fractional cents meter. A "1" in Bit 3 indicates that there are four rather than three stepping motors. Nibble 5A of BAM1 is used to store a keyboard character counter in order to tell the keyboard register routine when the keyboard register is full. Bit 0 is always "1."

Background operations that have an effect on DR, AR, or TOTAL are carried out according to checked arithmetic algorithms. There are three different arithmetic operations, the addition of postage in the "post office" mode, the decrementing of DR and corresponding incrementing of AR during a normal printing cycle, and a checking routine used during initialization, keyboard entry, and clearing the keyboard.

The basic premise of all the checked arithmetic algorithms is that the descending register DR and the ascending register AR must sum to the control total. In keeping with the fault tolerance aspect of the meter, there is one copy of each of these three registers in each BAM. During arithmetic operation, these registers are moved to the temporary registers in the BAMs described above. Prior to such a move, a verification is made that the contents of corresponding BAM registers are equal.

The contents of the temporary registers at the completion of various routines and tasks are shown in tabular form in FIG. 19. The particular sequences giving rise to these final states are now described.

A subroutine designated CHKTOT, carries out a number of the above verifications in three places—during initialization, during a keyboard clear, and while adding to the keyboard register in "mail room" mode. Subroutine CHKTOT checks both copies of the three permanent registers (DR, AR, TOTAL) to make sure that they are equal, moves them to temporary locations and checks that their temporary location values hold to the equation TAR+TDR=TTOTAL (TEMP2). It would require an extremely unlikely occurrence of two errors exactly complimenting each other to have a wrong TAR, TDR, or TTOTAL. As will be seen below, the other checked arithmetic algorithms carry out manipulations on TDR1, TDR2, and/or TEMP1 and thereafter update the permanent registers in both BAMs with these values. In order to facilitate reconstruction should microcomputer 90 cease to function properly before all updated registers have been copied into their permanent location, the non-updated descending and ascending registers are maintained in TDR2 and TAR2 respectively. The operation of CHKTOT is as follows:

1. DR1 and DR2 are compared.
2. DR1 is moved to TDR1 and TDR2.
3. TOTAL1 and TOTAL2 are compared.
4. TOTAL1 is moved to TEMP1 and TEMP2.
5. AR1 and AR2 are compared.
6. AR1 is moved to TAR1, TAR2, and TEMP1.
7. TDR1 is added to the copy of AR1 in TEMP1 and stored in TEMP1.
8. TEMP1 and TEMP2, which should both equal TOTAL are compared.

Although the print task and keyboard task routines will be described in detail below, the checked arithmetic aspect of those tasks will be described at this point. As each character is entered, a keyboard register, designated KB, is updated to reflect the entire entry since the last keyboard clear. The basic algorithm for keyboard entry is that each character entry causes new temporary values of AR and DR to be calculated, being given by AR+KB and DR−KB, respectively, and to be stored in TAR1 and TDR1, respectively. The updated temporary register values are checked to make sure that they sum to TOTAL. The particular sequences of steps for updating the temporary registers upon entry of a keyboard character is as follows.

1. The keyboard register KB is updated to reflect the total keyboard entry.
2. CHKTOT is called to get new copies of AR1 in TAR1 and TAR2 and of DR1 in TDR1 and TDR2.
3. KB is added to the copy of AR1 stored in TAR1, and the result is stored in TAR1.
4. KB is subtracted from the copy of DR1 stored in TDR1, and the result is stored in TDR1.
5. The updated TAR1 is moved to TEMP1.
6. The updated TDR1 is added to TEMP1 and the result stored back in TEMP1.
7. TEMP1 and TEMP2 (the latter having a checked copy of TOTAL) are compared to make sure that they are equal.

In a print cycle, updating of the permanent registers occurs after the print head has left home, or is expected to leave home as evidenced by either the LEFT HOME signal or the receipt of CLUTCH signal. Updating occurs as follows:

1. TDR1 is copied into DR1 and DR2.
2. TAR1 is copied to AR1 and AR2.
3. Batch and count arithmetic is done.
4. After returning to home, CHKTOT is called to check that the updated permanent registers are equal and hold to the required arithmetic constraint.

Additional checked arithmetic procedures are carried out when the meter is in the "post office" mode. When the meter is in the "post office" mode, the temporary registers are not updated during keyboard entry as described above in connection with the normal keyboard entry prior to a print cycle. Thus, prior to a change by the postal service employee, the state of the temporary registers is like that immediately following a call to CHKTOT. That is, the temporary registers have the current permanent values of the ascending and descending registers and the total.

As discussed above, special keys 40 and 42 allow the postal service employee to change the value of DR and TOTAL by adding or subtracting a corresponding amount (the keyboard register) from both. Thus, depression and release of clear batch key 42 causes the keyboard entry to be added while if clear KB key 40 is depressed while key 42 is also depressed, release of key 42 causes the keyboard entry to be subtracted. The basic arithmetic constraint is that the updated descending register (DR±KB) when added to AR must equal TOTAL±KB. Upon releasing clear batch key 42, the following steps take place.

1. KB is added/subtracted to/from TDR1 and the result stored in TDR1.
2. A check is made that DR will not be greater than $99,999.99 or less than zero.
3. KB is added/subtracted to/from TEMP1 (which contains TOTAL).
4. TEMP1 is moved to TEMP2.
5. TDR1 and TAR1 are added and the result stored in TEMP1.
6. TEMP1 and TEMP2 are compared.
7. TDR1 is moved to DR1 and DR2.
8. TEMP1 (new total) is copied to TOTAL1 and TOTAL2.
9. CHKTOT is called to insure that the moves were done without error.

In view of the above description of the foreground routine and the checked arithmetic algorithms, the initialization routine can be understood. The initialization routine is executed when MPCLR goes low in a power up cycle to permit operation of microcomputer 90, and performs those functions necessary to bring meter 5 into operating condition in a valid, known state. These functions may be summarized as follows:

1. Solenoid 85 is turned off (SON low) to inhibit printing unless specifically carried out under control of microcomputer 90.
2. The memory locations in RAM, the memory allocation of which is illustrated in FIG. 14, are set to zero.
3. The foreground registers are initialized with the foreground disabled so that the foreground routine will start triggering one-shots 113 and 114.
4. Timer PRCTR is set to provide an interval of 100 milliseconds, to allow the power to stabilize. Then the timer and its interrupt are enabled. After the 100 milliseconds the power loss interrupt in microcomputer 90 is enabled. By this time power is stable and SYSCLR is false and operation of the meter commences.

5. A check is made that the fault nibbles in BAMs 100 and 102 are zero. As discussed above, when meter 5 is set to a faulted condition, it should be impossible to bring the meter up on a power up cycle. Accordingly, detection of a non-zero value here indicates either a lack of ability to read a good zero from the fault nibbles, or a malfunction of the system reset circuitry or of the BAMs themselves. If a non-zero value is found, the meter is set to a faulted condition but no specific error code is written.

6. The information relating to meter type and maximum digit entry is recovered from the BAMs and written to registers in RAM for ready availability to the operating program.

7. The keyboard is cleared by executing a clear keyboard routine which in turn calls CHKTOT to check that the BAM contents are equal and hold to the arithmetic constraint.

8. REGONE1 and REGONE2, and REGTHO1 and REGTHO2 are checked to make sure that they are respectively equal.

9. The foreground is enabled for 100 milliseconds to update the switch registers.

10. The foreground is disabled and a check is made to see if the meter is on a base ($\overline{MB}$ low). If the meter is not on a base, the keyboard is cleared and the background dispatcher loop is entered where it is expected that the register display WAKEUP bit will be set.

11. Assuming the meter is on a base, the printer registers are set up and the stepper motors are stepped to 9999 without verification by sending out more step commands than are necessary. This provides for the possibility that the stepper motors are stiff or sloppy after a period of disuse. Once it is determined that the print wheels are at 9999, the meter is stepped to 0000 with verfying. The meter continues to try until reaching 0000, and will loop to the beginning of step 11 above if it can't. The background dispatcher loop is then entered, with the register display and keyboard WAKEUP bits set so that the keyboard register and selected register will be displayed.

FIGS. 20a, 20b and 20c, taken together, form a flow chart of the print routine for controlling postage printing and monitoring the operation of the print mechanism. Security is maintained by requiring the various events in a print cycle to occur in a well-defined sequence, and within predetermined time intervals. The meter is set to a fault (or soft fault) state if any of the relevant signals are inconsistent with the meter's being in a known and expected state. Broadly, the print routine positions stepper motors 45–48 (and their respective print wheels therewith) on receipt of a TAPE or ENVELOPE signal. When positioning is completed, solenoid 85 is turned on, and the CLUTCH and/or LEFT HOME signal is awaited. When the LEFT HOME signal indicates that the print head has left the home position or the CLUTCH signal indicates that the clutch has been pulled, AR and DR are updated from temporary locations in the BAMS and the batch and count registers are updated. Upon a return of the print head to its home position, the solenoid is then turned off. If only a single tape is to be printed the keyboard register is cleared. Either way, new temporary values (TAR=AR+KB, and TDR=DR−KB) are calculated.

During execution of the print routine keyboard entry and receipt of I/O signals are blocked. If while printing in response to an ENVELOPE signal, another ENVELOPE signal is received, the print routine does not end upon the print head's returning to the home position, but rather leaves the solenoid energized and calculates a new value of TAR and TDR. The print routine then leaves itself in a state where it is waiting for the CLUTCH and/or LEFT HOME signal after as if it had just completed positioning.

Before discussing the operation of the print routine in detail, reference should be had to FIG. 16 which illustrates schematically a portion of the data base from which the routine operates. Each stepper has two registers allocated to it, one designated STEPIN(X) and one designated STEPTK(X) where X is the number of the stepper. The most significant nibble of STEPIN carries the instruction indicating which of the four windings is to be energized. The least significant nibble of the STEPIN contains a binary decimal code for the Final Position the particular stepper motor is to assume prior to printing. This is normally determined from the appropriate digit of the keyboard register. The least significant nibble of STEPTK contains the Next Position to which the stepper is to be stepped, while the most significant nibble of STEPTK carries separate bits of information, indicating the direction to step, whether the present position (verified by reading the switches) is equal to Next Position, and also if equal to Last Position, whether a second try is being made to reach the next position, and whether the next position expected is a half position.

A register designated PRTSTA carries separate bits or groups of bits indicating which stepper is currently being stepped, the current printer task as will be described in detail below, whether the initialization routine is being executed, and the status of certain bits from REGSW (TAPE, ENVELOPE and REPEAT). Additionally, reference is made to those bits in R7FORG signifying the status of the MB, LEFT HOME, and CLUTCH signals.

The print routine is responsible for performing multiple functions at different times during a print cycle. In order to maintain a proper sequence, the routine performs tasks in a fixed order. At the completion of a given task, the routine updates the relevant bits in PRSTA so that subsequent entry into the routine will cause the next task in sequence to be carried out. The order of the tasks, and the numerical code corresponding to the different tasks are as follows:

Task 0—This is the state at the initiation of a print cycle and indicates that no task is pending. During task 0, the routine builds up portions of the required data base.

Task 1—The routine sends out the most recently executed commands (from the previous print cycle) in order to make sure that the positions of the steppers correspond to those that are known (i.e. stored in STEPIN). This is done to take account of the possibility that one or more of the steppers has been jarred away from its last position since the last positioning operation.

Task 2—The routine verifies that the steppers are in fact at their last position. Then the keyboard digits are copied to STEPIN to signify the final positions to be achieved, and the appropriate directions of stepping are chosen.

Task 3—The routine sends out commands at 1.6 millisecond intervals to cause the steppers to step to their final (keyboard) positions.

Task 4—This task is carried out once the stepper positioning has been completed. The routine is waiting for a signal indicating that the clutch has been pulled and/or that the print head has left its home position. If the CLUTCH signal is received first, the routine sets a 100 millisecond timer, within whose interval the LEFT HOME signal from the home sensor must be received. Once the print head has left its home position or the clutch is pulled, the BAM registers AR and DR are updated to reflect the amount of postage being printed on this cycle and the BATCH and COUNT registers are updated.

Task 5—This task checks that the CLUTCH signal has gone away and that the print head has returned to its home position. At this point, the task is set to 0.

Tasks 6 and 7—These tasks are carried out rather than tasks 4 and 5, respectively, if a new envelope signal is received once postioning has been carried out. Upon reaching task 7, the task is set to 4 to prepare for another printing operation.

Referring to FIG. 20a, the sequence of the print routine may be understood. It should be recognized that during a print cycle, the print routine may be entered multiple times in response to the TAPE/ENVELOPE WAKEUP, the HOME/CLUTCH WAKEUP or the TIMER WAKEUP. The routine immediately checks whether the meter is in the "post office" mode (logical branch 930), in which case the meter soft faults (block 932). Finding the meter to be in the "mail room" mode, the routine disables the foreground (block 935), checks that there are sufficient funds remaining (logical branch 937), and checks to determine whether all the steppers are at their final positions (logical branch 940). Assuming the positioning has been completed, the routine carries out tasks 4–7 as will be discussed below.

Prior to carrying out tasks 0–3 which effect positioning of the print wheels, the routine checks to make sure that the HOME/CLUTCH wakeup bit is not set (logical branch 942). If the HOME/CLUTCH WAKEUP is found to be set, the routine checks the cause (logical branch 945). An indication from the LEFT HOME signal that the print head has left its home position prior to the completion of positioning evidences a situation in which meter security is compromised since solenoid 85 or home sensor 300 may be malfunctioning. This is responded to by causing the meter to fault with hexadecimal code 3 (block 947). The presence of an unexpected clutch signal is generally caused by a base malfunction or improper paper handling and does not represent a threat to security. However operation must be suspended, and to this end the meter soft faults (block 950).

Assuming the HOME/CLUTCH WAKEUP is not present, a three way branch is made according to the current task (block 952). If the current task is 0, as is true on the first pass through the print routine during a particular print cycle, a "PRINTER ONLY" bit is set to inhibit the keyboard and I/O, relevant switch data from REGSW is loaded into PRSTA, and the task is set to 1 (block 955). The PRINTER ONLY bit remains set for the duration of the print cycle, and causes the main program to avoid testing whether I/O or keyboard requests are pending. From this point, the sequence of instructions followed is the same as if the task on entry was 1.

The basic constraints on the print positioning timing are dictated by the need to carry out the overall positioning within approximately 0.25 seconds as determined by the time it takes an envelope moving down the feed path to reach a position under the print head. Every command to a stepper lasts 6.4 or 12.6 milliseconds (if not able to move to the next position within 6.4 milliseconds). In order to result in a more even power drain, stepper commands are staggered at 1.6 millisecond intervals. The TIMER WAKEUP is turned off, a 1.6 millisecond timer is restarted and the initial command is sent (block 957). The initial command is in fact the last command that was sent to the particular stepper to make sure that the stepper is where it is thought to be, any possible difference being due to mechanical vibration and the like.

Tasks 1-3 are shown more specifically in FIG. 20b. Still in task 1, the routine tests whether all four steppers have been serviced (logical branch 960). If not, PRSTA is adjusted to prepare for the next stepper in sequence (block 962). The routine then returns to the main program after doing an initialization check which does the following: checks that in the initialization mode (logical branch 965) and that initialization is completed (logical branch 967). If it is, the steppers are turned off and the TIMER, TAPE/ENVELOPE, and HOME/CLUTCH WAKEUP bits are cleared (block 970) before returing to the main program.

The routine then loops so that on subsequent passes the initial command is sent to the remaining steppers (block 957), and when it is determined at logical branch 960 that all four steppers have been done, the task is set to 2 (block 972). The bits in PRSTA are set for the next stepper in the cycle (which at this point is the first one), and after the initialization check, the routine returns to the main program.

On the next pass through the print routine, the task is 2. After branching at block 952, the routine turns off the TIMER WAKEUP and restarts the 1.6 millisecond timer. The routine tests whether the stepper is at its next position (logical branch 975), and if it has not reached its next position within the 6.4 milliseconds, a bit is set (block 978), assuming that this was not the second try as determined at logical branch 980. If it was a second try, then it is checked to see if doing initialization (logical branch 981). If yes, a jump is made out of the print routine to completely restart the initialization of the printer routine from stepping to '9999' (block 982). Else, a soft fault is done (block 983).

Assuming the stepper has reached its next position, the routine branches according to whether task 2 or 3 is being executed (logical branch 984). If all four steppers have been serviced (logical branch 985), the routine checks whether they have all reached their next position (logical branch 988). For task 2 the next position is the final position.

If all the steppers have reached their next position, the routine branches (according to whether task 2 or task 3 is being executed (logical branch 990). On task 2 the digits of the keyboard register are copied to the least significant nibbles of the respective STEPIN registers (block 992). The routine then determines the direction of stepping (block 995). The task is then set to 3 (block 1000) and the routine returns to the main program.

On a subsequent entry during task 3, the routine branches at logical branch 982 in order to check whether the final position has been reached (logical branch 1002). If the final position has not been reached, the TIMER WAKEUP is turned off, the 1.6 millisecond timer is restarted, and the next command is sent out (block 1005). Once the final position has been reached, the routine tests whether all steppers have been serviced (branch 985), and branches as in task 2. Following logical branch 990, the timer is turned off, the solenoid is turned on and the task is set to 4 (block 1007) before doing the initialization check and returning to the main program.

On subsequent passes through the routine, it is ascertained at logical branch 940 that positioning has been completed, and tasks 4-7 are carried out. These tasks are shown specifically in FIG. 20c.

The routine first checks whether a TIMER WAKEUP has occurred (logical branch 1010). As will be discussed below, on subsequent tasks, this test may be true, but on task 4 it will not. The routine checks whether the TAPE/ENVELOPE WAKEUP bit is set (logical branch 1012) and if it has, the routine checks whether another envelope is on the way (logical branch 1015). If so, the task is set to 6 or 7, depending upon whether it was 4 or 5 (block 1017). The TAPE/EVELOPE WAKEUP is turned off prior to a return to the main program (block 1020). Assuming that neither the TIMER WAKEUP nor the TAPE/ENVELOPE WAKEUP had been set, the only cause for entry into the print routine is that the HOME/CLUTCH WAKEUP bit had been set. This WAKEUP bit is turned off (block 1022) and a test is made whether the LEFT HOME signal indicates that the print head has left its home position (logical branch 1025). Assuming the print head has not left its home position, the routine checks whether the CLUTCH signal is present (logical branch 1027). If the task is 5 or 7, the routine returns to the main program at logical branch 1030. Otherwise, a 100 millisecond timing interval is set (block 1032). The purpose of this timing interval is to enforce the requirement that the LEFT HOME signal is received within 100 milliseconds of the CLUTCH signal. A failure of this to occur evidences a loss of home sensor 300, which loss would leave the meter with no redundancy in the event of a failure in the base. This failure manifests itself by the foreground's setting the TIMER WAKEUP. This will be detected on subsequent entry at logical branch 1010, and is handled by causing the meter to fault with hexadecimal code 2 (block 1033). After setting the 100 millisecond timer, which occurs on task 4 or 6, the ascending and descending registers (AR1, AR2, DR1 and DR2) and the BATCH and COUNT registers in the BAMS are updated and the task is set to 5 or 7 prior to a return to the main program (block 1035).

If, at logical branch 1025, it is ascertained that the print head has left home, the timer is turned off (block 1037). On task 5 or 7 (as determined at logical branch 1038) the routine returns to the main program. Otherwise, the BAM and task updates (block 1035) are made before returning to the main program.

If it is determined at logical branches 1025 and 1027 that the CLUTCH signal and the LEFT HOME signal are both absent, the routine returns to the main program on tasks 4 or 6 (logical branch 1040). If the task is 5 or 7, this state indicates that the print head has returned to its home position. The routine tests whether the task is 7 (logical branch 1045), and turns off the steppers and solenoid (block 1047), if the task is 5, while they are left on if the task is 7. If task 5, the task is set to 0 (block 1052) while if the task is 7, the task is set to 4 (block 1055). New updated values of the registers are stored in the temporary registers in the BAMs (block 1057). If the task is 5, a check is made whether a single tape was to be printed (logical branch 1060). If a single tape was to be printed, the keyboard register is cleared and the routine calls the subroutine CHKTOT (block 1062) to make sure that the new registers adhere to the basic arithmetic constraint. Where envelopes or multiple tapes are to be printed, the temporary registers and keyboard register are set up to so that a subsequent print cycle can occur without requiring a new keyboard entry. A single tape (not repeat mode), on the other hand, once printed, causes the keyboard register to be cleared.

Prior to returning to the main program, the available funds are checked (logical branch 1065) and if it is found that insufficient funds remain to print another tape or envelope of the keyboard register value, "Add $" light 22 is lit, the steppers and solenoid are turned off, and the task is set to 0 (block 1067). If the task has been set to 4, indicating that a new print cycle is to occur, the program returns to the main program while if the task is 0 the PRINTER ONLY bit is turned off to enable the keyboard and I/O (block 1070).

FIGS. 21a and 21b, taken together, form a flow chart of the keyboard routine. Generally, the keyboard routine discovers what keyboard key or keys have been pressed and takes action accordingly, as for example by updating the keyboard register or various BAM registers. This routine is entered when the background dispatcher loop detects the KEYBOARD WAKEUP bit to have been set, which as discussed above occurs when the foreground routine detects a change to REG89 or REG07. In addition to keyboard key status, REG89 contains the status of switches 27 (fractional cents entry) and 30 (POMODE). The flow through this routine is controlled by the least significant nibble of KEYSTA, designated CC for current character and by a 1-bit flag, designated F0. Usually CC is set equal to the current keyboard switch being pressed, but it may assume values outside the range 0-9 to indicated special circumstances. In particular, if no keys are depressed CC=10; if keys "7", "8", and "9" are all pressed to signify that all the display segments are to be energized, CC=12; and if the keyboard register KB is full, CC=14. As discussed above, in the "mail room" mode, four characters may be entered before the keyboard register KB is considered full (three if the meter 5 only contains three steppers). In the "post office" mode, the entry capability expands to the number of characters in the maximum permissible value (e.g. seven characters if the maximum value allowed is $99,999.99). The determination whether KB is full is on the basis of the keyboard register character counter KBCC which is the tenth nibble of KB.

Before describing the precise operation and sequence of the keyboard routine, it is helpful to consider the various ways in which exit from the keyboard routine occurs. Generally, a return to the main program (background dispatcher loop) occurs via one of four exit points 1100, 1102, 1105, and 1107, designated A, B, C, and D, respectively. Upon branching to exit point A, the routine tests whether the printer is still busy (logical branch 1110), returning to the main program if it is and turning off the I/O and KEYBOARD WAKEUP bits and the PRINTER ONLY bit if it is not, prior to returning to the main program (block 1112). Upon branching to exit point B, the routine sets CC=10 (block 1115) and returns via exit point A. Upon branching to exit point C, the routine clears the keyboard register and sets up a register request (block 1117), displays the keyboard register if the meter is in the "mail room" mode (block 1120), and returns via exit point B. Upon a branch to exit point D, thr routine lights "Add $" lamp 22 clears the keyboard register, sets CC=14 (block 1122), and returns via exit point A.

Upon entry into the keyboard routine, the foreground is immediately disabled and the routine initialized (block 1125). For definiteness, consider first the case where a single numeric key has been pressed. Prior to entry into the routine, CC will have been initialized to 10 (or left set at 10 from the last time that all keys had been released). The routine tests whether CC=12 (block 1127), and upon finding it not equal to 12, sets flag F0=1 only if CC=14 (block 1130). On this entry, F0 will not be set equal to 1. The routine then tests whether keys "7", "8", and "9" are all depressed (logical branch 1132), and upon finding such not to be the case, the routine undertakes to discover which key has been depressed (software vector 1135). This test is made according to a specific hierarchy wherein the keys are tested in the order "7", "8", "9", "4", "5", "6", "1", "2", "3", CLEAR BATCH, "0", and CLEAR KB. This particular order is appropriate for a standard calculator configured keyboard and in some measure avoids the problem wherein a right handed person, in addition to the intended key, depresses the key immediately to the right or below. Assuming a numeric key to have been discovered as the first key to be depressed, the routine tests whether the keyboard register is full, i.e. whether F0=1 (logical branch 1137).

If the keyboard register is full, the routine returns to the main program via exit point A. If it is not full, a test is made whether CC=10 (logical branch 1140) and return via exit point A if CC is not equal to 10 since this would indicate another key to still be pressed. If CC=10, the routine sets CC equal to the numeric character found (block 1142). The routine then increments KBCC and updates the keyboard register by left shfiting the current contents and entering the newly discovered character in the rightmost position (least significant) (block 1145). The precise nibble which is considered the rightmost or least significant position is nibble 0 if the meter is in the "mail room" mode, and is a fractional cents meter, and selector switch 27 is set for fractional cents entry. Otherwise, it is nibble 1 of the keyboard register. If with the additional character, the keyboard register is full, the routine sets CC=14 (block 1147), and then sets up a register request (block 1150). The routine then tests whether the meter is in the post office mode (logical branch 1152) and returns via exit point B if it is. Otherwise, the temporary registers TDR and TAR in the BAMs are updated as described above (block 1155). The checked arithmetic algorithm is carried out to make sure that the updated TAR and TDR sum to the control total (logical branch 1157), and if not, the meter faults with a hexadecimal code 7 written into the BAM location reserved for that purpose (block 1160). Under normal (non-fault) circumstances the routine then displays the new keyboard register (block 1162), tests whether the updated decending register has become negative (logical branch 1165), and if not, returns via exit point A. If TDR has become negative, the routine returns via exit point D.

Assume that keys "7", "8", and "9" are all depressed and that the current pass through the routine is in response to the last one of these keys to have been depressed. At logical branch 1132, the routine branches differently from the above described sequence, sets up the segment codes so that all segments in the displays will be illuminated, and clears the keyboard register (block 1167). Then the routine sets CC=12 (block 1170) prior to a return via exit point A. The next pass through the keyboard routine finds CC=12 at logical branch 1127, whereupon the routine tests whether all of keys "7", "8", and "9" have been released (logical branch 1172). If not all of these three keys have been released, the routine returns via exit point A, but if all of the keys have been released, the routine returns via exit point C in order to clear the keyboard register, turn off the display of all segments, and set CC=10.

If, at software vector 1135, it is determined that CLEAR KB is the only key to be depressed, the routine exits via exit point C. If it is found that no key is currently being depressed, the routine tests whether the entry into the routine was due to a new change into the "post office" mode (logical branch 1175) and returns via exit point C if it was. Otherwise, the routine returns via exit point B if CC is found equal to 12 or 14, and by exit point A otherwise (logical branch 1177).

It will be recalled that action in response to and CLEAR BATCH key occurs when the key is released, and may require the CLEAR KB key to have been depressed in the interim. In the event that the CLEAR BATCH key is discovered to have been depressed, the routine initially sets F0=0 (block 1180) and enables the foreground (block 1182) in preparation for waiting until the key is released. The routine then executes a wait loop, 1185, during which it tests whether F0 has been set to 1 (logical branch 1187). Initially, F0 will be 0 and the routine sets F0=1 when and if it finds the CLEAR KB switch to have been depressed (block 1190)). The routine then tests whether the CLEAR BATCH key has been released (logical branch 1192), and if not, loops back to logical branch 1187. When the clear batch key is released, as discovered at logical branch 1192, the foreground is again disabled (block 1195).

The routine tests whether the meter is in the "post office" mode (logical branch 1197), and if so, adjusts temporary register TDR up or down by the keyboard register contents, depending on whether the CLEAR KB key had been depressed during the time that the CLEAR BATCH key had been pressed (block 1200). The routine then tests whether the descending register value would be in the permissible range (logical branch 1202). If not, the routine returns via exit point D in order to display the "Add $" lamp. If the descending register value is a permissible one, the routine adjusts the control total temporary register in the same direction as it had adjusted the descending register and updates permanent registers DR and TOTAL (block 1105) prior to returning via exit point C. If at logical branch 1197, the routine finds that the meter is in the "mail room" mode, the routine tests whether F0=1 (logical branch 1207) to determine whether the CLEAR KB key had been depressed during the time that the CLEAR BATCH key was depressed. If so, the routine clears the keyboard and batch registers (block 1210) prior to a return via exit point C. Otherwise, the routine returns via exit point B and in effect ignores depression and release of the CLEAR BATCH key.

The register display routine is entered in response to a REGISTER DISPLAY WAKEUP, and is responsible for determining which register is to be displayed and displaying it. The routine determines which display to display the information on, and takes care of decimal point placement and blanking leading zeros. The register display routine is straightforward and will not be described in further detail.

THe I/O routine is entered in response to an I/O WAKEUP and has the function of receiving signals from outside the meter in order to carry out those functions that would be carried out in response to various combinations of keyboard key depressions and selector switch positions. The I/O routine will not be described in detail.

In summary, it can be seen that the present invention provides a microcomputerized postage meter having a high degree of security and fault tolerance so that critical register data is preserved under almost any conceivable failure condition. Once a failure has occurred, the meter recognizes its own lack of redundancy, and hence susceptibility to losing the data, and responds to this condition by activating internal circuitry for disabling the meter and preventing further operation until the meter is reset at the factory. Although disabled, the data in the registers is accessible for possible diagnostic purposes.

While the above description provides a full and complete disclosure of the preferred embodiment of the invention, various modifications, alternate constructions, and equivalents may be employed without departing from the true spirit and scope of the invention. For example, while the circuitry for inhibiting meter functioning upon detection of a fault condition includes a specific type of flip-flop, other flip-flop types or settable-resettable circuit elements could be adapted for use with the present invention. Similarly, while the use of stepper motors and mechanical verification contacts represents a preferred and relatively economical way to accomplish print wheel setting, other actuating mechanisms will be readily apparent to those of ordinary skill in the art. Also, the particular keyboard sequences and responses, while representative of appropriate data management, can be varied so long as such variations are carried out in a consistent manner. Accordingly, the above description and illustration should not be construed as limiting the scope of the invention, which is defined by the appended claims.

We claim:

1. In a microcomputerized postage meter having a microcomputer programmed for supervising the printing operation and for generating, maintaining, and verifying accounting information, a postage printing mechanism coupled to the microcomputer for printing postage in response to instructions from the microcomputer, and input means coupled to the microcomputer for communicating data to the microcomputer, the microcomputer and printing mechanism being located within a secure housing, the improvement comprising:

first and second independent non-volatile memory means coupled to the microcomputer and located within the secure housing;

the programmed microcomputer including means for storing a particular item of accounting information in each of corresponding locations of the first and second non-volatile memory means, means for retrieving the contents of the corresponding locations, and means for comparing the contents of the corresponding locations; and non-user-resettable means coupled to the microcomputer for deactivating the meter in response to a disagreement between the contents of the corresponding locations, the non-user-resettable means for deactivating the meter being located within the secure housing, and, once set, being beyond control of the microcomputer;

the non-user-resettable means for deactivating the meter having associated means coupled to the first and second non-volatile memory means for preventing the microcomputer from writing data into either of the first and second non-volatile memory means and associated means coupled to the postage printing mechanism for preventing activation of the postage printing mechanism.

2. The invention of claim 1, and further comprising an alternate communication path coupled to the first and second non-volatile memory means to enable the external retrieval of the contents of the corresponding locations independently of the microcomputer after the meter has been deactivated.

3. The invention of claim 1 wherein the microcomputer further includes means responsive to the disagreement between the contents of the corresponding locations for storing a failure code representative of such disagreement in the first non-volatile memory means prior to the time that the non-user-resettable means for deactivating the meter acts to deactivate the meter.

4. In a microcomputerized postage meter having a microcomputer, a postage printing mechanism coupled to the microcomputer for printing postage in response to instructions from the microcomputer, and input means coupled to the microcomputer for communicating data to the microcomputer, the microcomputer and printing mechanism being located in a secure housing, the improvement comprising:

first and second independent non-volatile memory means coupled to the microcomputer and located within the secure housing;

the programmed microcomputer having means for generating a set of accounting information items, the values of which items have an internal arithmetic relationship to one another irrespective of their individual values, means for writing the set of accounting items into each of corresponding pluralities of locations in the first and second non-volatile memory means, means for retrieving the contents of the corresponding pluralities of locations, and means for comparing the contents of the corresponding pluralities of locations;

non-user-resettable means coupled to the microcomputer for deactivating the meter in response to a disagreement between the contents of the corresponding pluralities of locations, the non-user-resettable means for deactivating the meter being located within the secure housing, and, once set, being beyond control of the microcomputer;

the non-user-resettable means for deactivating the meter having associated means coupled to the first and second non-volatile memory means for preventing the microcomputer from writing data into either of the first and second non-volatile memory means and associated means coupled to the postage printing mechanism for preventing activation of the postage printing mechanism; and an alternate communication path coupled to the first and second non-volatile memory means to enable the external retrieval of the contents of the corresponding pluralities of locations independently of the microcomputer to facilitate possible reconstruction of the correct values of the accounting items.

5. The invention of claim 4 wherein each of the first and second non-volatile memory means includes read enabling means requiring designated voltage inputs, and also comprising an alternate power path to permit the designated voltage inputs to be supplied by an alternate power supply independently of the power for the microcomputer.

6. The invention of claim 4 wherein the microcomputer further includes means responsive to the disagreement between the contents of the corresponding pluralities of locations for storing a failure code representative of such disagreement in the first non-volatile memory means prior to the time that the non-user-resettable means for deactivating the meter acts to deactivate the meter.

7. In a microcomputerized postage meter having a microcomputer, a postage printing mechanism coupled to the microcomputer for printing postage in response to instructions from the microcomputer, and input means coupled to the microcomputer for communicating value setting and print initiation signals to the microcomputer, the improvement comprising:

a non-volatile memory system including first, second, and third non-volatile memory means coupled to the microcomputer, the first, second, and third non-volatile memory means having respective first, second, and third pluralities of locations, at least the first and second non-volatile memory means being independent of one another;

the programmed microcomputer having means for generating a set of accounting information items, the values of which items have an internal arithmetic relationship to one another irrespective of their individual values, means for storing the set of accounting information items in corresponding locations of the first and second pluralities of locations, means for storing the set of accounting information items in the third plurality of locations, means for changing the values of at least two of the items stored in the third plurality of locations in response to a value setting signal from the input means, the values of the items stored in the third plurality of locations including the changed values, maintaining the same internal arithmetic relationship, and means for copying the changed values into the first and second pluralities of locations when the postage printing mechanism is activated in response to a print initiation signal from the input means.

8. The invention of claim 7 wherein the first and third non-volatile memory means are physically within the same memory chip.

9. In a microcomputerized postage meter having a microcomputer operable according to a program for supervising the printing operation and for generating, maintaining, and verifying accounting information, postage printing means coupled to the microcomputer for printing postage in response to instructions from the microcomputer, and input means coupled to the microcomputer for communicating data to the microcomputer, the improvement comprising:

first and second independent non-volatile memory means coupled to the microcomputer;

monostable multivibrator means having a trigger input and an output, the multivibrator means being operable to maintain the multivibrator output at a first logic level for a predetermined time in response to a triggering signal at the trigger input and to allow the multivibrator output to assume a second logic level distinct from the first logic level when the predetermined time elapses without a triggering signal at the trigger input;

non-user-resettable means coupled to the multivibrator output for deactivating the meter in response to the appearance of the second logic level on the multivibrator output, the non-user-resettable means for deactivating the meter, once set, being beyond control of the microcomputer and operating to prevent the microcomputer from writing data into either of the first and second non-volatile memory means and to prevent activation of the postage printing mechanism; and means associated with the microcomputer and coupled to the trigger input for repeatedly generating a triggering signal at intervals substantially less than the predetermined time during operation of the meter;

the programmed microcomputer having means for detecting a failure condition, means for generating a failure code representative of the type of failure, means for suppressing the triggering signal generating means in response to the detection of a failure condition such that the detection of a failure causes the multivibrator output subsequently to assume the second logic level, whereupon the meter becomes deactivated, and means for storing the failure code in the first and second non-volatile memory means prior to the time that the multivibrator output assumes the second logic level.

10. The invention of claim 9 wherein the non-user-resettable means for deactivating the meter comprises bistable second multivibrator means having an input coupled to the output of the monostable first-mentioned multivibrator means.

11. In a microcomputerized postage meter having a microcomputer, and input means coupled to the microcomputer for generating signals representative of the value of postage to be printed, the improvement comprising:

a print head including a print element having postage printing indicia formed thereon and being capable of assuming any one of a plurality of serially disposed positions, the print head being capable of assuming a home position in which printing is impossible;

stepping motor means coupled to the print element, the stepping motor means having a plurality of positions corresponding to the plurality of print element positions;

motor driving means coupled to the microcomputer for driving the stepping motor means from a first of the plurality of positions to a second serially adjacent one of the plurality of positions;

position indicator means coupled to the microcomputer for generating and communicating to the microcomputer an electrical signal representative of the position of the stepping motor means;

print head sensor means coupled to the microcomputer for generating and communicating to the microcomputer an electrical signal respresentative of whether the print head is in its home position;

means associated with the microcomputer for activating the motor driving means to effect positioning of the print element;

means associated with the microcomputer and responsive to the position indicator means for determining whether the stepping motor means has moved from the first position to the second position within a predetermined time interval;

means for suspending operation of the meter in response to a determination that the stepping motor means has not moved from the first position to the second position within the fixed time interval;

means associated with the microcomputer and responsive to the print head sensor means for determining whether the print head has left its home position prior to completion of the positioning of the print element; and non-user-resettable means coupled to the microcomputer for deactivating the meter in response to the determination that the print head has left its home position prior to completion of the positioning of the print element.

12. In a microcomputerized postage meter having a microcomputer, a postage printing mechanism coupled to the microcomputer for printing postage in response to instructions from the microcomputer, and input means coupled to the microcomputer for communicating data to the microcomputer, the microcomputer and the printing mechanism being located in a secure housing, the improvement comprising:

non-volatile memory means coupled to the microcomputer, including a plurality of memory locations for storing a set of accounting information items;

bistable multivibrator means including self-contained power supply means and having an output capable of assuming first and second distinct logic levels in response to first and second respective states of the bistable multivibrator means, the bistable multivibrator means, once in the second state, being beyond the control of the microcomputer and being resettable to the first state only by physical access to the interior of the secure housing;

means associated with the microcomputer for detecting a failure condition;

means associated with the microcomputer and coupled to the bistable multivibrator means for causing the bistable multivibrator means to assume its second state in response to the detection of a failure condition;

power surveillance means for generating a power loss signal in response to a low power condition;

means responsive to the power loss signal for generating a system clear signal;

means responsive to the system clear signal for preventing the microcomputer from writing data into the non-volatile memory means;

means responsive to the system clear signal for preventing activation of the printing mechanism; and means responsive to the logic level of the bistable multivibrator output for maintaining the system clear signal active in response to the appearance of the second logic level regardless of the state of the power loss signal.

13. The invention of claim 12, and further comprising:

means responsive to the power loss signal for generating a microcomputer clear signal; and means responsive to the microcomputer clear signal for disabling the microcomputer;

wherein the means for maintaining the system clear signal active also operates to maintain the microcomputer clear signal active.

14. The invention of claim 12 wherein the means for causing the bistable multivibrator means to assume its second state comprises:

a retriggerable one-shot;

means associated with the microcomputer and coupled to the one-shot for repeatedly triggering the one-shot at intervals less than a predetermined time to maintain the one-shot in a first state during operation of the meter; and means associated with the microcomputer for suppressing the triggering in response to the detection of a failure condition to allow the one-shot to assume a second state.

15. The invention of claim 1 or 4 wherein the non-user-resettable means for deactivating the meter, the associated means for preventing the microcomputer from writing, and the associated means for preventing activation of the postage printing mechanism together comprise:

bistable multivibrator means including self-contained power supply means and having an output capable of assuming first and second distinct logic levels in response to first and second respective states of the bistable multivibrator means, the bistable multivibrator means, once in the second state, being resettable to the first state only by physical access to the interior of the secure housing;

means associated with the microcomputer for causing the bistable multivibrator means to assume its second state in response to the disagreement;

means responsive to the logic level of the bistable multivibrator output for generating a system clear signal in response to the appearance of the second logic level on the bistable multivibrator means output;

means responsive to the system clear signal for preventing the microcomputer from writing data into either of the first and second non-volatile memory means;

means responsive to the system clear signal for preventing activation of the printing mechanism;

means responsive to the appearance of the second logic level on the bistable multivibrator output for generating a microcomputer clear signal; and means responsive to the microcomputer clear signal for disabling the microcomputer.

16. The invention of claim 15, and further comprising:

power surveillance means for generating a power loss signal in response to a low power condition;

the means for generating the system clear signal and the means for generating the microcomputer clear signal being further responsive to the power loss signal.

17. The invention of claim 1 or 4, and further comprising power surveillance means for generating a power loss signal in response to a low power condition, and wherein the non-user resettable means for deactivating the meter, the associated means for preventing the microcomputer from writing, and the associated means for preventing activation of the postage printing mechanism together comprise:

means responsive to the power loss signal for generating a system clear signal and a microcomputer clear signal;

means responsive to the system clear signal for preventing the microcomputer from writing data into either of the first and second non-volatile memory means when the system clear signal is active;

means responsive to the system clear signal for preventing activation of the printing mechanism when the system clear signal is active;

means responsive to the microcomputer clear signal for disabling the microcomputer when the microcomputer clear signal is active;

the system clear and microcomputer clear signals being relatively timed to ensure microcomputer operation during activation of the printing mechanism; and means for maintaining the system clear signal active in response to the disagreement, regardless of the state of the power loss signal.

18. The invention of claim 15 wherein the non-volatile memory means includes read enabling means requiring designated voltage inputs, and further comprising an alternate power path to permit the designated voltage inputs to be supplied by an alternate power supply independently of the power for the microcomputer.

19. The invention of claim 1 or 4 or 7 wherein each of the first and second non-volatile memory means includes a CMOS memory and a battery.

20. The invention of claim 4 or 7 wherein the set of accounting information items includes an ascending balance, a descending balance, and a control total, and wherein the internal arithmetic relationship is that the sum of the ascending and descending balances equals the control total.

21. The invention of claim 1 or 4 or 9 wherein the non-user-resettable means for deactivating the meter also operates to prevent further operation of the microcomputer.

* * * * *

UNITED STATES PATENT AND TRADEMARK OFFICE
CERTIFICATE OF CORRECTION

PATENT NO. : 4,484,307                                         Page 1 of 2

DATED     : November 20, 1984

INVENTOR(S) : Jesse T. Quatse, et al

It is certified that error appears in the above-identified patent and that said Letters Patent is hereby corrected as shown below:

IN THE DRAWINGS:

Figure 13, replace "792" by --1792--.
　　Figure 13, replace "720" by --792--.
　　Figure 13, add the reference numeral --829-- for the
　　　capacitor at the top of the Figure above resistor 828.

IN THE SPECIFICATION:

Col. 10, line 18, add --the-- before "keylock"; replace
　　　"32" by --(not shown)--.

Col. 18, line 57, replace "on emitter" by --at circuit
　　　point--.

Col. 19, line 27, replace "407" by --409--.
　　Col. 19, line 27, replace "408" by --407--.
　　Col. 19, line 28, replace "409" by --408--.
　　Col. 19, line 39, replace "447" by --417--.

Col. 25, line 7, replace "792" by --1792--.

Col. 27, line 19, replace "17" by --15--.
　　Col. 27, line 20, replace "15" by --17--.

UNITED STATES PATENT AND TRADEMARK OFFICE
CERTIFICATE OF CORRECTION

PATENT NO. : 4,484,307

DATED : November 20, 1984

INVENTOR(S) : Jesse T. Quatse et al.

It is certified that error appears in the above-identified patent and that said Letters Patent is hereby corrected as shown below:

Col. 31, line 50, replace "5A" by -- 6A --.

Signed and Sealed this

Twenty-first Day of July, 1987

Attest:

*Attesting Officer*

DONALD J. QUIGG

*Commissioner of Patents and Trademarks*